(12) United States Patent
Wakizaka et al.

(10) Patent No.: US 8,877,376 B2
(45) Date of Patent: Nov. 4, 2014

(54) ELECTRODE FOR SECONDARY BATTERY, SLURRY FOR SECONDARY BATTERY ELECTRODE, AND SECONDARY BATTERY

(75) Inventors: Yasuhiro Wakizaka, Tokyo (JP); Kei Kobayashi, Tokyo (JP); Toshiyuki Sekine, Tokyo (JP)

(73) Assignee: ZEON Corporation, Tokyo (JP)

( * ) Notice: Subject to any disclaimer, the term of this patent is extended or adjusted under 35 U.S.C. 154(b) by 245 days.

(21) Appl. No.: 13/381,030

(22) PCT Filed: Jun. 30, 2010

(86) PCT No.: PCT/JP2010/061132
§ 371 (c)(1),
(2), (4) Date: Dec. 27, 2011

(87) PCT Pub. No.: WO2011/002016
PCT Pub. Date: Jan. 6, 2011

(65) Prior Publication Data
US 2012/0107690 A1    May 3, 2012

(30) Foreign Application Priority Data

Jul. 1, 2009 (JP) ................................ 2009-157278
Sep. 28, 2009 (JP) ................................ 2009-222951

(51) Int. Cl.
| | |
|---|---|
| *H01M 4/13* | (2010.01) |
| *H01M 4/24* | (2006.01) |
| *H01M 4/32* | (2006.01) |
| *H01M 4/62* | (2006.01) |
| *H01M 10/0525* | (2010.01) |

(52) U.S. Cl.
CPC ............ *H01M 4/13* (2013.01); *H01M 4/242* (2013.01); *H01M 4/32* (2013.01); *H01M 4/621* (2013.01); *H01M 4/622* (2013.01); *H01M 10/0525* (2013.01); *Y02E 60/122* (2013.01); *Y02E 60/124* (2013.01)
USPC .......................................... 429/217; 429/232

(58) Field of Classification Search
CPC ..................................................... H01M 4/622
USPC ................................................. 429/217, 232
See application file for complete search history.

(56) References Cited

U.S. PATENT DOCUMENTS

| 6,110,619 A | 8/2000 | Zhang et al. |
| 6,312,853 B1 | 11/2001 | Zhang et al. |
| 6,436,573 B1 | 8/2002 | Goto et al. |

FOREIGN PATENT DOCUMENTS

| CN | 1285085 A | 2/2001 |
| JP | 11-238505 A | 8/1999 |
| JP | 11-354126 A | 12/1999 |
| JP | 2000-348728 A | 12/2000 |
| JP | 2001-527275 A | 12/2001 |
| JP | 2002-256129 A | 9/2002 |
| JP | 2005-203370 A | 7/2005 |
| JP | 2006-49158 A | 2/2006 |
| JP | 2006-196205 A | 7/2006 |
| JP | 2006-260782 A | 9/2006 |
| JP | 2000-182620 A | 10/2006 |
| JP | 2006-278303 A | 10/2006 |
| JP | 2009-123523 A | 6/2009 |
| WO | WO 99/33127 A1 | 7/1999 |

OTHER PUBLICATIONS

International Search Report for PCT/JP2010/061132, mailed on Oct. 5, 2010.
Chinese Office Action dated Oct. 31, 2013, issued in corresponding Chinese Patent Application No. 201080028715.8.
Extended European Search Report, dated Jan. 24, 2014, for Patent Application No. 10794184.1.
Wang et al., "Polymer wiring of insulating electrode materials: An approach to improve energy density of lithium-ion batteries", Electrochemistry Communications, vol. 11, 2009, pp. 1350-1352.
Japanese Office Action, dated Mar. 11, 2014, for Japanese Patent Application No. 2011-520953.
Japanese Decision of a Patent Grant dated Sep. 2, 2014, issued in corresponding Japanese Patent Application No. 2011-520953.

*Primary Examiner* — Tracy Dove
(74) *Attorney, Agent, or Firm* — Birch, Stewart, Kolasch & Birch, LLP

(57) ABSTRACT

A secondary battery electrode which suppresses decrease in capacity and lithium deposition at low temperatures is provided. An electrode for a secondary battery includes an electrode active material layer containing a polymer having a cationic group, an anion corresponding to the cationic group, and an electrode active material, and the cation density in the polymer is 0.1 to 15 meq/g.

6 Claims, No Drawings

ELECTRODE FOR SECONDARY BATTERY, SLURRY FOR SECONDARY BATTERY ELECTRODE, AND SECONDARY BATTERY

TECHNICAL FIELD

The present invention relates to a slurry for an electrode used in an electrode for a secondary battery such as a lithium ion secondary battery, an electrode for a secondary battery, and a secondary battery.

BACKGROUND ART

A lithium ion secondary battery provides the highest energy density among practical batteries, and in particular is often used for compact electronics. Further, the lithium ion secondary battery is expected to be developed for use in automobiles, and expected to have improved output characteristics and to operate stably over a wide temperature range.

In a general positive electrode of such a lithium ion secondary battery, an electrode active material layer is formed on a collector by binding thereto a lithium-containing metal oxide such as $LiCoO_2$, $LiMn_2O_4$, or $LiFePO_4$, which is used as an electrode active material for the positive electrode (hereinafter referred to as "positive electrode active material") with a binder (sometimes referred to as a binding agent) such as polyvinylidene fluoride. On the other hand, in a negative electrode, an electrode active material layer is formed on a collector by binding thereto a carbonaceous (amorphous) carbon material, a metal oxide, a metal sulfide or the like, which is used as an electrode active material for the negative electrode (hereinafter referred to as "negative electrode active material") with a binder such as a styrene-butadiene copolymer.

In order to solve the problems of output characteristics of the lithium ion secondary battery, attempts have been made to improve the dispersibility of an electrode active material or a conducting agent (also referred to as "conductivity imparting agent" or "conductivity imparting material") in the electrode.

For example, Patent Document 1 discloses that use of a polymer having a cationic group and an anion corresponding to the cationic group as a binder can improve the dispersibility of an electrode active material, and as a result, the dispersibility of a conducting agent is improved, thereby realizing a battery excellent in electrode surface smoothness and output characteristics.

Further, Patent Document 2 describes that use of a binder containing a polymer having an anionic functional group and a compound having an anionic functional group and a cationic functional group can improve both adhesion with a collector and mobility of lithium ions in the proximity of the surface of an electrode.

On the other hand, in order to solve the problems with low-temperature characteristics of the lithium ion secondary battery, attempts have been made to improve the binding power of the electrode. Patent Document 3 discloses an electrode formed with use of a graphite material as an active material for a negative electrode, together with use of polyethylene or an ethylene-vinyl acetate copolymer as a binder. Patent Document 3 further discloses that heat treatment of the electrode at a temperature equal to or higher than the melting point of the binder results in improvement in binding power in the electrode.

LIST OF PRIOR ART DOCUMENTS

Patent Documents

Patent Document 1: Japanese Patent Application Laid-Open No. 2006-278303 A

Patent Document 2: Japanese Patent Application Laid-Open No. 2009-123523 A

Patent Document 3: Japanese Patent Application Laid-Open No. H11-238505 A (U.S. Pat. No. 6,436,573)

SUMMARY OF THE INVENTION

Problem to be Solved by the Invention

However, in the method disclosed in Patent Document 1, a polymer having a low cation density is used, and therefore the surface of the electrode active material is completely coated with the polymer having a cationic group due to binding with a surface functional group of the electrode active material. As a result, although the use of the aforementioned binder can provide a battery having excellent output characteristics, use of the battery at a low temperature of 0° C. or lower causes deposition of lithium metal, which leads to significant decrease in discharge capacity. For this reason, there have been problems with stable operation over a wider temperature range.

Although the method in Patent Document 2 can improve the mobility of lithium ions, the method can not cause selective placement of the compound having an anionic functional group and a cationic functional group in the proximity of the surface of the electrode active material. Therefore the method cannot suppress deposition of lithium metal particularly in a low-temperature conditions.

Although the method in Patent Document 3 can bring about improvement in the binding power and consequent improvement of the discharge characteristics, the method is also unable to suppress deposition of lithium metal. In addition, when the binding power is increased in the method, the flexibility of the electrode is decreased. Thus, with this method, repetition of cycles for a long period of time cause separation of an electrode layer and consequent decrease in the capacity.

All the aforementioned facts have been found by the studies conducted by the present inventors.

Accordingly, it is an object of the present invention to provide an electrode for a lithium ion secondary battery which suppresses the deposition of lithium metal, and with which a secondary battery exhibiting excellent low-temperature characteristics is obtainable.

Means for Solving the Problem

In order to solve the aforementioned problems, the present inventors have conducted intensive studies. As a result, they have found out that placement of the polymer selectively in the proximity of the surface of the electrode active material, suppression of the lithium deposition and improvement in the low-temperature discharge capacity of the resulting secondary battery can be achieved by addition of a polymer having a cationic group and an anion corresponding to the cationic group to an electrode containing the electrode active material, and setting the cation density in the polymer within a specific amount range.

This attempt was based on speculation that existence of the polymer selectively in the proximity of the surface of the electrode active material might cause significant decrease in desolvation resistance during insertion of lithium, whereby deposition of lithium which had not been inserted on the electrode surface might be suppressed. Based on these findings, the present invention has been completed.

For solving the aforementioned problems, the present invention includes the following features as the gist.

(1) An electrode for a secondary battery, comprising an electrode active material layer containing a polymer having a cationic group, an anion corresponding to the cationic group, and an electrode active material, wherein a cation density in the polymer is 0.1 to 15 meq/g.

(2) The aforementioned electrode for a secondary battery, wherein the electrode active material layer further contains a particulate polymer.

(3) The aforementioned electrode for a secondary battery, wherein a weight ratio of the polymer having a cationic group relative to the particulate polymer in the electrode active material layer is 5:95 to 40:60.

(4) The aforementioned electrode for a secondary battery, wherein the particulate polymer contains an anion.

(5) The aforementioned electrode for a secondary battery, wherein the cationic group is an alicyclic cationic group or a heterocyclic cationic group.

(6) A slurry for a secondary battery electrode, comprising a polymer having a cationic group, an anion corresponding to the cationic group, an electrode active material, and a solvent, wherein a cation density in the polymer is 0.1 to 15 meq/g.

(7) A secondary battery comprising a positive electrode, a negative electrode, a separator, and an electrolytic solution, wherein at least one of the positive electrode and the negative electrode is the aforementioned electrode for a secondary battery.

Effect of the Invention

According to the present invention, a specific species of polymer with a specific range of cation density is added to an electrode active material layer. In the electrode for a secondary battery obtained thereby, this polymer suppresses resistance on the surface of the electrode active material during insertion of lithium, to prevent lithium deposition on the electrode surface. Thus the resulting secondary battery exhibits a high discharge capacity at temperatures including a low temperature range of 0° C. or lower.

EMBODIMENTS OF THE INVENTION

The present invention will be described in detail hereinbelow.

The electrode for a secondary battery of the present invention (hereinafter this may simply be referred to as "electrode") has an electrode active material layer (this may also be referred to as "electrode mixture layer") containing a polymer having a cationic group, an anion corresponding to the cationic group (hereinafter this may be referred to as "counter anion"), and an electrode active material. Herein, the anion corresponding to the cationic group refers to an anion which is capable of being bound to the cationic group.

(Cationic Group)

In the present invention, the cationic group refers to an atom or an atomic group which is positively charged as a result of electron discharge. It is preferable that the cationic group that the polymer used in the present invention has includes a heteroatom. In the present invention, the heteroatom is defined as an atom other than hydrogen, carbon, and metal. Among them, a cationic group containing one or more of nitrogen, phosphorus, sulfur, oxygen and boron is preferable because they have moderate interaction with a solvent of an electrolytic solution which will be described later and are likely to suppress the deposition of lithium metal. A cationic group containing one or more of nitrogen, phosphorus, and sulfur is most preferable.

Specific examples of the aforementioned cationic group containing a heteroatom may include an aliphatic cationic group represented by the formula (I):

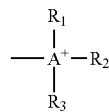

(wherein A represents a heteroatom, $R_1$ to $R_3$ may be the same as or different from one another, one or two of $R_1$ to $R_3$ may be a hydrogen atom, and one to three of $R_1$ to $R_3$ represent an alkyl group that may be substituted. That is, $R_1$ to $R_3$ each independently represent a hydrogen atom or an optionally substituted alkyl group, but at least one of $R_1$ to $R_3$ in the aliphatic cationic group represented by the formula (I) represents an optionally substituted alkyl group. Accordingly, although one or two of $R_1$ to $R_3$ may be a hydrogen atom, the instance wherein all of three $R_1$ to $R_3$ are hydrogen atoms is excluded.), an alicyclic cationic group represented by the formula (II):

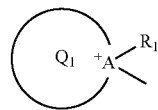

(wherein A represents a heteroatom, $Q_1$ represents an aliphatic ring group that may be substituted, and $R_1$ represents a hydrogen atom or an alkyl group that may be substituted), and a heterocyclic cationic group represented by the formula (III):

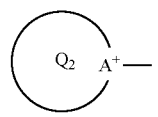

(wherein A represents a heteroatom, and $Q_2$ represents a heteroaromatic ring group that may be substituted.).

In the present invention, the cationic groups may be classified into primary to quaternary cationic groups depending on the number of hydrogen atoms as $R_1$ to $R_3$ in the formulae.

For example, among the aliphatic cationic groups, those wherein none of $R_1$ to $R_3$ are a hydrogen atom are referred to as a quaternary cationic group, those wherein one of $R_1$ to $R_3$ is a hydrogen atom are referred to as a tertiary cationic group, and those wherein two of $R_1$ to $R_3$ are hydrogen atoms are referred to as a secondary cationic group. Among the alicyclic cationic groups, those wherein $R_1$ is a hydrogen atom are referred to as a tertiary cationic group, and those wherein $R_1$ is not a hydrogen atom are referred to as a quaternary cationic group. As to the heterocyclic cationic group, all of them are quaternary cationic groups.

Examples of the optionally substituted alkyl group in the formulae (I) and (II) may include a linear, branched, or cyclic unsubstituted C1 to C18 alkyl group such as a methyl group, an ethyl group, a propyl group, an isopropyl group, a butyl group, an isobutyl group, a sec-butyl group, a tert-butyl group, a pentyl group, a pentyl group, a neopentyl group, a hexyl group, an isohexyl group, a decyl group, a dodecyl group, an octadecyl group, a cyclopentyl group, and a cyclohexyl group; and a group in which one or two or more hydrogen atoms constituting the unsubstituted alkyl group are substituted with substituents. Examples of substituents of the optionally substituted alkyl group may include an aryl group such as a phenyl group; a di-substituted amino group such as a dimethyl amino group; a nitro group; a cyano group; a carboxyl group; an acyl group such as a formyl group and an acetyl group; an alkoxy group such as a methoxy group, an ethoxy group and a 2-methoxyethoxy group; an alkenyl group such as a vinyl group; and a hydroxyl group. Examples of the substituted alkyl group may include a 1-methoxyethyl group, a 2-(dimethylamino)methyl group, a benzyl group, a 1-phenylethyl group, a 2-phenylethyl group, a 2-methoxyethyl group, a 2-(2-methoxyethoxy)ethyl group, and an allyl group.

Examples of the optionally substituted aliphatic ring group in the formula (II) may include a pyrrolidyl group, a 2-methylpyrrolidyl group, a 3-methylpyrrolidyl group, a 2-ethylpyrrolidyl group, a 3-ethylpyrrolidyl group, a 2,2-dimethylpyrrolidyl group, a 2,3-dimethylpyrrolidyl group, a piperidyl group, a 2-methylpiperidyl group, a 3-methylpiperidyl group, a 4-methylpiperidyl group, a 2,6-dimethylpiperidyl group, a 2,2,6,6-tetramethylpiperidyl group, a morpholino group, a 2-methylmorpholino group, and a 3-methylmorpholino group.

Examples of the optionally substituted heteroaromatic ring group in the formula (III) may include a pyridyl group, a 2-methylpyridyl group, a 3-methylpyridyl group, a 4-methylpyridyl group, a 2,6-dimethylpyridyl group, a 2-methyl-6-ethylpyridyl group, a 1-methylimidazolyl group, a 1,2-dimethylimidazolyl group, a 1-ethylimidazolyl group, a 1-propylimidazolyl group, a 1-butylimidazolyl group, a 1-pentylimidazolyl group, a 1-hexylimidazolyl group, a thiophene group, a thiazolyl group, a 1-methylthiazolyl group, a 1,2-dimethylthiazolyl group, a 1-ethylthiazolyl group, a 1-propylthiazolyl group, a 1-butylthiazolyl group, a 1-pentylthiazolyl group, and a 1-hexylthiazolyl group.

Among these cationic groups having a heteroatom, the tertiary or quaternary cationic group is preferable, and the quaternary cationic group is particularly preferred since the electrode obtained therewith has high binding properties between the electrode active material and the binder, and a slurry for an electrode (also referred to as a slurry for forming an electrode) has high stability when forming the slurry for an electrode. Among them, the alicyclic cationic group represented by the formula (II) and the heterocyclic cationic group represented by the formula (III) are more preferable since they are easily produced and they have high suppression effect on the lithium metal deposition.

The cation density in the polymer used in the present invention (that is, the density of cationic group in the polymer) is 0.1 meq/g or more and 15 meq/g or less per the polymer. In particular, when the electrode active material layer contains a particulate polymer containing anions, the cation density is preferably 0.5 meq/g or more, more preferably 1 meq/g or more, and particularly preferably 2 meq/g or more, and preferably 10 meq/g or less, more preferably 7.5 meq/g or less, and particularly preferably 5 meq/g or less. Further, when the electrode active material layer does not contain the particulate polymer containing anions, the cation density is preferably 2 meq/g or more, more preferably 4 meq/g or more, and further preferably 5 meq/g or more, and preferably 12 meq/g or less, more preferably 9 meq/g or less, further preferably 8 meq/g or less, particularly preferably 7 meq/g or less, and most preferably 6 meq/g or less. Among them, it is most preferable that the electrode active material layer contains a particulate polymer containing anions and that the cation density is 2 meq/g or more and 5 meq/g or less. When the cation density is less than 0.1 meq/g, the deposition of lithium appears during discharge, and the electrode tends to be inferior in low-temperature characteristics. On the other hand, when the cation density exceeds 15 meq/g, the stability of the slurry for the secondary battery electrode, which will be described later, is decreased, which causes decrease in productivity during manufacture of electrodes and decrease in smoothness of an electrode surface, which in turn cause increase in the ratio of disqualified batteries in production. When the cation density falls within the aforementioned range, the excellent low-temperature characteristics can be obtained, and the slurry for an electrode can have an excellent stability, which results in improved productivity and smoothness of the electrode. As used herein, meq/g refers to a milligram equivalent of cationic group per gram of the polymer, and "1 eq" is a value that represents "1 mol/ion valence".

The cation density in the polymer having a cationic group used in the present invention may be measured by colloidal titration. For example, for the group of quaternary amine, measurement may be performed by colloidal titration using potassium polyvinyl sulfate as a standard anion.

(Anion)

The anion corresponding to the cationic group (that is, counter anion) used in the present invention includes a negative ion. As the negative ion, those containing a halogen element or a chalcogen element are preferable.

Herein, "halogen element" means an atomic group consisting of fluorine, chlorine, bromine, iodine, and astatine, which are the group 17 elements. Among these elements, chlorine, bromine, and iodine are preferable since therewith a strong electrolyte having a large degree of dissociation ratio can be formed. Thus as the counter anion, one or more selected from the group consisting of a chlorine ion, a bromine ion, and an iodine ion is preferable.

"Chalcogen element" means an atomic group consisting of oxygen, sulfur, selenium, tellurium, and polonium, which are the group 16 elements. Among these elements, one or more selected from the group consisting of a sulfonate ion, a sulfate ion, and a nitrate ion, which contain sulfur or oxygen as a chalcogen element are preferable since therewith a strong electrolyte having a large degree of dissociation ratio can be formed.

These counter anions are usually bound to the cationic group of the polymer having a cationic group. However, the counter anions do not necessarily have to form a bond with the cationic group as long as the effects of the present invention are obtained. Further, the counter anions may be bound to the polymer having a cationic group through a bond other than the bond with the cationic group. When the counter anions are bound to the polymer having a cationic group through the bond with the cationic group or the bond other than the bond with the cationic group, the aforementioned polymer having a cationic group has both a cationic group and a counter anion.

The amount of the counter anion may be arbitrary determined as long as therewith the effects of the present invention is obtainable. Since the counter anion corresponds to the cationic group in the polymer used in the present invention, the counter anion usually has the same equivalent density (meq/g) as that of the corresponding cationic group.

(Polymer Having Cationic Group)

The weight mean molecular weight of the polymer having a cationic group used in the present invention is preferably 1,000 or more, more preferably 5,000 or more, and further preferably 10,000 or more, and preferably 500,000 or less, more preferably 300,000 or less, further preferably 200,000 or less, and particularly preferably 100,000 or less, in terms of a standard polyethylene oxide converted value measured by gel permeation chromatography (which may be referred to hereinbelow as "GPC") using a sodium nitrate aqueous solution as a developing solvent. If the weight mean molecular weight of the polymer having a cationic group falls within the aforementioned range, the polymer having a cationic group in the electrode exhibits high adsorption stability to the surface of an electrode active material, and the polymer acquires suitable level of mobility to thereby exhibit excellent low-temperature characteristics. In addition thereto, the resulting slurry for an electrode thereby acquires excellent stability, whereby productivity can be improved and a smooth electrode can be obtained.

From the viewpoints of improving the flexibility and bend resistance of the electrode, the glass transition temperature (Tg) of the polymer having a cationic group used in the present invention is preferably 30° C. or lower, and further preferably 0° C. or lower. Further, a lower limit of the glass transition temperature (Tg) is preferably −100° C. or higher, and further preferably −70° C. or higher.

The polymer having a cationic group used in the present invention is usually prepared as a solution or a dispersion liquid containing the polymer and a solvent for manufacturing an electrode. In this case, the viscosity of the solution or dispersion liquid is usually 1 mPa·S or more, and preferably 50 mPa·S or more, and usually 300,000 mPa·S or lower, and preferably 10,000 mPa·S or lower. The viscosity is a value measured with a Brookfield type viscometer at 25° C. and a rotation number of 60 rpm.

The solvent used for the solution or dispersion liquid of the polymer having a cationic group used in the present invention is not particularly limited as long as the polymer can be dissolved or dispersed uniformly in the solvent. A solvent capable of dissolving the polymer is preferable. The reason therefor is that use of the solution enables existence of a large amount of polymers on the surface of the electrode active material upon manufacturing electrodes, with which the effect of promoting desolvation of lithium on the surface of an electrode active material is easily obtained. Further, it is desirable to use a solvent that is the same as the solvent used for the slurry for preparing the electrode, since, as described later, the solution is uniformly mixed with a solvent used for the slurry for preparing the electrode during production of the slurry for the electrode. Specifically, acetone, toluene, cyclohexanone, cyclopentane, tetrahydrofuran, cyclohexane, xylene, water, or N-methylpyrrolidone, or a mixture solvent thereof is preferable. Among them, water is particularly preferable since water has high solubility of the polymer used in the present invention, and is often used as a solvent for an electrode slurry.

Examples of a method for producing the polymer having a cationic group used in the present invention may include (first method) a method in which a monomer having a cationic group is homopolymerized or copolymerized with a copolymerizable monomer; (second method) a method of an addition reaction of a compound having a cationic group to a polymer obtained from a polymerizable monomer; (third method) a method in which a polymerizable monomer is anionically polymerized using a compound having a tertiary cationic group as a polymerization catalyst; and (fourth method) a method in which a monomer having a secondary cationic group is polymerized under basic conditions, and the resultant polymer is neutralized with acids.

Examples of the monomer having a cationic group used in the (first method) may include unsaturated monomers having the aforementioned cationic group. To the monomer having a cationic group, a counter anion corresponding to the cationic group is usually bound.

In the present invention, existence of a cation with a specific density range and a counter anion corresponding to the cationic group is essential in order to exert the effect of the present invention. Regardless of the species of the cation and counter anion, the effects of the present invention can be exerted. Therefore, the combination of the cation and the counter anion is not particularly limited, and the effects of the present invention can be achieved with any combination.

Examples of the monomers wherein the counter anion is a chlorine ion may include unsaturated monomers having a nitrogen-containing aliphatic cation represented by the formula (I) such as vinylalkylammonium chloride, (meth)acryloylalkylammonium chloride, (di)allylalkylammonium chloride, and aminoalkyl(meth)acrylamide; unsaturated monomers having a nitrogen-containing alicyclic cation represented by the formula (II) such as vinylalkylpyrrolidinium chloride, (meth)acryloylalkylpyrrolidinium chloride, (di)allylalkylpyrrolidinium chloride, vinylalkylpiperidinium chloride, (meth)acryloylalkylpiperidinium chloride, (di)allylalkylpiperidinium chloride, vinylalkylmorpholinium chloride, (meth)acryloylalkylmorpholinium chloride, and (di)allylalkylmorpholinium chloride; unsaturated monomers having a nitrogen-containing heterocyclic cation represented by the formula (III) such as vinylpyridinium chloride, (meth)acryloylalkylpyridinium chloride, (di)allylalkylpyridinium chloride, vinylimidazolium chloride, (meth)acryloylalkylimidazolium chloride, and (di)allylalkylimidazolium chloride; unsaturated monomers having a phosphorus-containing aliphatic cation such as vinylalkylphosphonium chloride, (meth)acryloylalkylphosphonium chloride, and (di)allylalkylphosphonium chloride; and unsaturated monomers having a sulfur-containing aliphatic cation such as vinylalkylsulfonium chloride, (meth)acryloylalkylsulfonium chloride, and (di)allylalkylsulfonium chloride.

The polymer having a cationic group used in the present invention may be one obtained by homopolymerization of a monomer having a cationic group or copolymerization of the monomer with a polymerizable monomer that is copolymerizable with the monomer having a cationic group. Examples of the polymerizable monomer that is copolymerizable may include unsaturated carboxylic acids such as acrylic acid, methacrylic acid, itaconic acid, and fumaric acid; carboxylic acid esters having two or more carbon-carbon double bonds such as ethylene glycol dimethacrylate, diethylene glycol dimethacrylate, and trimethylolpropane triacrylate; styrene-based monomers, such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; amide-based monomers such as acrylamide, N-methylolacaylamide, and acrylamide-2-methylpropanesulfonic acid; α,β-unsaturated nitrile compounds such as acrylonitrile, and methacrylonitrile; olefins such as ethylene, and propylene; diene-based monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl viel ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole.

Among them, in terms of possession of anionic functional group and low tendency to aggregate with the particulate polymer due to electrostatic repulsion, unsaturated carboxylic acids such as acrylic acid, methacrylic acid, itaconic acid, and fumaric acid are preferable.

The containing ratio of the copolymerizable monomer unit in the polymer having a cationic group used in the present invention is preferably 1% by weight or more, and more preferably 10% by weight or more, and preferably 90% by weight or less, and more preferably 50% by weight or less.

The method for polymerization in the (first method) is not particularly limited, and may be any methods such as a solution polymerization method, a suspension polymerization method, and an emulsion polymerization method.

Examples of polymerization initiators used in polymerization may include peroxides such as hydrogen peroxide and tert-butyl hydroperoxide; redox initiators including combination of these peroxides with reducing agents such as bivalent iron ($Fe^{++}$), $Na_2SO_3$, and ascorbic acid; organic peroxides such as lauroyl peroxide, disopropyl peroxydicarbonate, di(2-ethylhexyl) peroxydicarbonate, t-butyl peroxypivalate, and 3,5,5-trimethyl hexanoyl peroxide; azo compounds such as $\alpha,\alpha'$-azobisisobutyronitrile; and persulfates such as ammonium persulfate and potassium persulfate.

It is preferable that the solvent used in solution polymerization is an aqueous medium. Examples of the aqueous medium may include water, aqueous solution of inorganic acids (hydrochloric acid, sulfuric acid, phosphoric acid, polyphosphoric acid, etc.), aqueous solution of organic acids, and aqueous solution of salts of inorganic acids (sodium chloride, zinc chloride, calcium chloride, magnesium chloride, etc.).

Examples of suspending agents used in suspension polymerization may include polyvinyl alcohol, partially saponified polyvinyl acetate, cellulose derivatives such as methylcellulose, synthesis macromolecular substances such as polyvinyl pyrrolidone, maleic anhydride-vinyl acetate copolymer, and polyacrylamide, and natural macromolecular substances such as starch and gelatin.

Examples of emulsifying agents used in emulsion polymerization may include anionic emulsifying agents such as sodium alkylbenzenesulfonate and sodium laurylsulfate, nonionic emulsifying agents such as polyoxyethylene alkyl ether and polyoxyethylene sorbitan fatty acid partial ester. Further, if needed, a molecular weight modifier such as trichloroethylene, thioglycol, and dodecyl mercaptan may be used.

The aforementioned polymerization initiator, monomer, suspending agent or emulsifying agent, and molecular weight modifier may be added simultaneously to a polymerization system at the initiation of polymerization, or may be added separately during the polymerization. The polymerization is usually performed at 35 to 80° C. under stirring.

In the (second method), firstly a polymer is formed, and then addition reaction of a compound having a cationic group to the polymer is performed. To the compound having a cationic group, a counter anion corresponding to the cationic group is usually bound.

In this case, similar to the aforementioned enumeration, the polymerization method may be any of the solution polymerization method, suspension polymerization method, or emulsion polymerization method. The optimal production method may be selected depending on the condition of later addition reaction or characteristics of polymers to be obtained. For example, when the addition reaction is performed in an aqueous system, it is advantageous to perform emulsion polymerization for obtaining the polymer as fine aqueous dispersion particles. Further, when the addition reaction is performed in a solvent system, the solution polymerization method or the suspension polymerization method using a lower alcohol such as methanol as a polymerization medium is preferable, and the typical suspension polymerization method may also be employed.

Further, an example of the method for addition reaction of a compound having a cationic group to a formed polymer may be, as a method for introducing a quaternary cationic group, a method wherein a tertiary amine is added to the polymer in the presence or absence of an acid. As the tertiary amine, saturated tertiary amines such as pyridine, dimethyllaurylamine, dimethylstearylamine, triethylamine, and dimethylmethoxyethylamine; or unsaturated tertiary amines such as dimethylallylamine, diethylaminoethyl (meth)acrylate, and dimethylaminopropyl (meth)acrylamide may be used. As the acid, saturated carboxylic acid such as acetic acid and lactic acid; or unsaturated carboxylic acid such as (meth)acrylic acid and crotonic acid may be used. The addition reaction of the tertiary amine to the polymer may be performed in a solvent in which both are dissolved, or may be performed by direct melt mixing of both materials. It is preferable that the addition reaction is performed in a solvent at 40 to 60° C.

In the present invention, the pH of the polymer having a cationic group is preferably 6 or greater, and more preferably 7 or greater, and preferably 12 or less, and more preferably 10 or less. The polymer having a pH of the aforementioned range do not cause aggregation of the particulate polymers even when the polymer is mixed with the particulate polymer in the slurry for an electrode, and therefore the stability of the slurry for an electrode can be maintained.

It is preferable that the polymer having a cationic group used in the present invention is the one that has been subjected to a particulate metal removal process for removing particulate metal contained in a polymer solution or a polymer dispersion liquid in a polymer production process. When the containing amount of a particulate metal component contained in the polymer solution or the polymer dispersion liquid is 10 ppm or less, metal ion crosslinking that occurs with the lapse of time between the polymers in the slurry for an electrode, which will be described later, can be prevented, and therefore increase in viscosity can be prevented. Further, the concern of the secondary battery about increase of self-discharge caused by internal short-circuit or dissolution or deposition during charging is small, and the cycle characteristics and safety of the battery are improved.

The method for removing the particulate metal component from the polymer solution or the polymer dispersion liquid in the particulate metal removal process is not particularly limited, and examples thereof may include a removing method by filtration with a filtration filter, a removing method using a vibration sieve, a removing method by centrifugation, and a removing method by magnetic force. In particular, the removing method by magnetic force is preferable since the subject to be removed is the metal component and therefore the metal foreign component can be thereby removed in a selective and efficient manner. The removing method by magnetic force is not particularly limited as long as it is a method capable of removing a metal component, and in view of the productivity and removal efficiency, the method is performed preferably by disposing a magnetic filter in the production line of the polymer.

In the present invention, the containing ratio of the polymer having a cationic group in the electrode active material layer is preferably 0.01% by weight or more, and more preferably 0.05% by weight or more, and preferably 5% by weight or less, more preferably 3% by weight or less, and particularly preferably 1% by weight or less. When the counter anion is bound to the polymer having a cationic group, it is preferable that the containing ratio of the polymer including the weight of the counter anion is within the aforementioned range. When the containing ratio of the polymer having a cationic group in the electrode active material layer falls within the aforementioned range, excellent low-temperature characteristics can be obtained, and the resulting slurry for an electrode acquires excellent stability, whereby productivity can be improved and a smooth electrode can be obtained.

(Electrode Active Material)

The electrode active material used in the electrode for a secondary battery of the present invention may be selected depending on the secondary battery in which the electrode is utilized. Examples of the secondary battery may include a lithium ion secondary battery and a nickel metal hydride secondary battery.

When the electrode for a secondary battery of the present invention is used for a positive electrode of a lithium ion secondary battery, the positive electrode active materials are classified into ones formed of an inorganic compound and ones formed of an organic compound.

Examples of the positive electrode active material formed of an inorganic compound may include transition metal oxides, complex oxides of lithium and transition metal, and transition metal sulfides. As the transition metal, Fe, Co, Ni, Mn, or the like is used. Specific examples of the inorganic compound used in the positive electrode active material may include lithium-containing complex metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may be partially element-substituted. As the positive electrode active material formed of an organic compound, conductive polymers such as polyacetylene and poly-p-phenylene may be used. Since iron-based oxides have poor electric conductivity, the iron-based oxides may be used as an electrode active material covered with a carbon material by reduction firing in the presence of carbon source substance. Further, these compounds may be partially element-substituted.

The positive electrode active material for a lithium ion secondary battery may also be a mixture of the aforementioned inorganic compound and organic compound. The particle diameter of the positive electrode active material is appropriately selected depending on other components of the battery. From the viewpoints of improvement in battery characteristics such as load characteristics and cycle characteristics, a 50% volume cumulative diameter is usually 0.1 μm or larger, and preferably 1 μm or larger, and usually 50 μm or smaller, and preferably 20 μm or smaller. When the 50% volume cumulative diameter falls within this range, the secondary battery having a large charge and discharge capacity can be obtained, and the handling during production of the slurry for an electrode and the electrode is facilitated. The 50% volume cumulative diameter may be determined by measurement of particle size distribution using laser diffraction.

When the electrode for a secondary battery of the present invention is used for a negative electrode of the lithium ion secondary battery, examples of the negative electrode active material may include carbonaceous materials such as amorphous carbon, graphite, natural black lead, mezo carbon micro beads, and carbon fiber derived from pitch, and conductive polymers such as polyacene. Further, as the negative electrode active material, metals such as silicon, tin, zinc, manganese, iron, and nickel, an alloy thereof, an oxide or a sulfate of the metal or alloy, and the like are used. In addition, metal lithium, a lithium alloy such as Li—Al, Li—Bi—Cd, and Li—Sn—Cd, a lithium transition metal nitride, silicon, or the like may be used. As the electrode active material, a substance on the surface of which a conducting agent is attached by mechanical modification may be also used. The particle diameter of the negative electrode active material is appropriately selected depending on other components of the battery, and from the viewpoints of improvement in battery characteristics such as initial efficiency, load characteristics, and cycle characteristics, a 50% volume cumulative diameter is usually 1 μm or larger, and preferably 15 μm or larger, and usually 50 μm or smaller, and preferably 30 μm or smaller.

When the electrode for a secondary battery of the present invention is used for a positive electrode of a nickel metal hydride secondary battery, examples of the positive electrode active material may include nickel hydroxide particles. The nickel hydroxide particles may contain cobalt, zinc, cadmium, or the like in a solid solution state. The surface of the nickel hydroxide particles may be coated with an alkaline-heat-treated cobalt compound.

When the electrode for a secondary battery of the present invention is used for a negative electrode of the nickel metal hydride secondary battery, the hydrogen-storing alloy particle as the negative electrode active material is not particularly limited as long as it can store hydrogen which is electrochemically generated in an alkaline electrolytic solution during charge of the battery and easily release the stored hydrogen during discharge. Preferred examples thereof may include particles formed of $AB_5$-type, TiNi-type, and TiFe-type hydrogen-storing alloys. For example, multielement hydrogen-storing alloy particles in which part of Ni in $LaNi_5$, $MmNi_5$ (Mm is misch metal), $LmNi_5$ (Lm is at least one species selected from rare-earth elements including La), and an alloy thereof is substituted with one or more elements selected from the group consisting of Al, Mn, Co, Ti, Cu, Zn, Zr, Cr, and B may be used. In particular, a hydrogen-storing alloy particle having a composition represented by a general formula: $L_mNi_wCo_xMn_yAl_z$ (the total value of atomic ratios w, x, y, and z is $4.80 \leq w+x+y+z \leq 5.40$) is suitable since the particle size reduction that occurs with the repetition of the charge-discharge cycle is suppressed, to thereby improve the charge-discharge cycle characteristics.

The containing ratio of the electrode active material in the electrode active material layer is preferably 90% by weight or more, and more preferably 95% by weight or more, and preferably 99.9% by weight or less, and more preferably 99% by weight or less. When the containing ratio of the electrode active material in the electrode active material falls within this range, the battery with the electrode active material can exert high capacity, as well as flexibility and binding properties.

(Particulate Polymer)

In the present invention, the electrode active material layer may contain a particulate polymer (that may also be referred to as a particulate macromolecule) in addition to the polymer having a cationic group, the counter anion corresponding to the cationic group, and the electrode active material. When the electrode active material layer contains the particulate polymer, binding properties of the electrode is improved, and strength against mechanical forces applied in processes such as winding of the electrode is increased. In addition, separation of the electrode active material layer off the electrode is reduced, and therefore the risk of short circuit, or the like, caused by separated substances is decreased.

The particulate polymer is usually prepared as a dispersion liquid in which polymer particles having binding properties are dispersed in water or an organic solvent (hereinafter, these dispersion liquids may be collectively referred to as a "binder dispersion liquid"). When the binder dispersion liquid is an aqueous dispersion liquid, examples of the particulate polymer may include polymer particles of diene-based polymers, acrylic polymers, fluorine-based polymers, and silicon-based polymers.

Among them, a non-fluorine polymer that does not contain fluorine is preferable. Due to its high electronegativity, presence of fluorine in the particulate polymer may cause interaction with cation and may therefore reduce lithium metal deposition suppressing effect.

It is more preferable that the particulate polymer is an amorphous polymer. When the particulate polymer is amorphous, the electrode active material layer exerts excellent flexibility, and the high lithium metal deposition suppressing effect is exerted as well by the mobility of the polymer inside the battery. The degree of crystallinity of the particulate polymer is preferably 10% or less, and further preferably 5% or less. Among the non-fluorine polymers and the amorphous polymers, a diene-based polymer and an acrylic polymer are preferable since the binding properties with the electrode active material and the strength and flexibility of the obtained electrode are excellent.

Further, when the binder dispersion liquid is a non-aqueous (using an organic solvent as a dispersion medium) dispersion liquid, examples of the particulate polymer may usually include vinyl-based polymers such as polyethylene, polypropylene, polyisobutylene, polyvinyl chloride, polyvinylidene chloride, polyvinylidene fluoride, polytetrafluoroethylene, polyvinyl acetate, polyvinyl alcohol, polyvinyl isobutyl ether, polyacrylonitrile, polymethacrylonitrile, polymethyl methacrylate, polymethyl acrylate, polyethyl methacrylate, allyl acetate, and polystyrene; diene-based polymers such as polybutadiene, and polyisoprene; ether-based polymers containing a heteroatom in a main chain such as polyoxymethylene, polyoxyethylene, polycyclic thioether, and polydimethyl siloxane; condensed ester-based polymers such as polylactone polycyclic anhydride, polyethylene terephthalate, and polycarbonate; nylon 6, nylon 66, poly-m-phenylene isophthalamide, poly-p-phenylene terephthalamide, and polypyromellitimide.

The diene-based polymer is a polymer containing a monomer unit that is obtained by polymerization of a conjugated diene such as butadiene and isoprene, and the binder dispersion liquid thereof is usually prepared as an aqueous dispersion liquid. The ratio of the monomer unit obtained by the polymerization of the conjugated diene in the diene-based polymer is usually 40% by weight or more, preferably 50% by weight or more, and more preferably 60% by weight or more, and usually 100% or less. Examples of the diene-based polymers may include homopolymers of conjugated diene such as polybutadiene and polyisoprene; and copolymers of conjugated diene with a copolymerizable monomer. Examples of the copolymerizable monomer may include $\alpha,\beta$-unsaturated nitrile compounds such as acrylonitrile and methacrylonitrile; unsaturated carboxylic acids such as acrylic acid, methacrylic acid, itaconic acid, and fumaric acid; styrene-based monomers such as styrene, chlorostyrene, vinyltoluene, t-butyl styrene, vinylbenzoic acid, methyl vinylbenzoate, vinylnaphthalene, chloromethylstyrene, hydroxymethylstyrene, $\alpha$-methylstyrene, and divinylbenzene; olefins such as ethylene and propylene; diene-based monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole.

The acrylic polymer is a polymer containing a monomer unit obtained by polymerization of acrylic acid ester and/or methacrylic acid ester, and a binder dispersion liquid thereof is usually prepared as an aqueous dispersion liquid. The ratio of the monomer unit obtained by polymerization of the acrylic acid ester and/or methacrylic acid ester is usually 40% by weight or more, preferably 50% by weight or more, and more preferably 60% by weight or more, and usually 100% or less. Examples of acrylic polymers may include homopolymers of acrylic acid ester and/or methacrylic acid ester, and copolymers of acrylic acid ester and/or methacrylic acid ester with a copolymerizable monomer. Examples of the copolymerizable monomer may include unsaturated carboxylic acids such as acrylic acid, methacrylic acid, itaconic acid, and fumaric acid; carboxylic acid esters having two or more carbon-carbon double bonds such as ethylene glycol dimethacrylate, diethylene glycol dimethacrylate, and trimethylolpropane triacrylate; styrene-based monomers such as styrene, chlorostyrene, vinyltoluene, t-butylstyrene, vinylbenzoic acid, methyl vinylbenzoate, vinylnaphthalene, chloromethylstyrene, hydroxymethylstyrene, $\alpha$-methylstyrene, and divinylbenzene; amide-based monomers such as acrylamide, N-methylolacrylamide, and acrylamide-2-methylpropanesulfonic acid; $\alpha,\beta$-unsaturated nitrile compounds such as acrylonitrile and methacrylonitrile; olefins such as ethylene and propylene; diene-based monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole.

If the particulate polymer is used as a binder for a positive electrode, it is preferably an acrylic polymer which is a saturated polymer not containing an unsaturated bond in a main chain since such a polymer has excellent oxidation resistance during charging. Further, if the particulate polymer is used as a binder for a negative electrode, it is preferably a diene-based polymer since the diene-based polymer has excellent reduction resistance, and exerts strong binding power.

In terms of improvement in adhesion with a collector, the particulate polymer used in the electrode for a secondary battery of the present invention preferably contains an anion. The anion contained in the particulate polymer is an anion different from the counter anion corresponding to the cationic group, and is contained in the particulate polymer. When the particulate polymer contains the anion, the adhesion with a collector is improved, and the adhesion strength with an electrode plate is increased. The anion may be incorporated in the particulate polymer as an anionic group. Specifically, the anion may be incorporated in the particulate polymer by using a monomer containing an anionic group as a monomer constituting the particulate polymer, or by using an additive for polymerization such as an emulsifying agent, an initiator, and a terminator that contains an anionic group during the polymerization process which will be described later.

The containing ratio of the anion relative to the total amount of the particulate polymer varies depending on cases such as a case where the monomer unit contains the anionic group, a case where the emulsifying agent contains the anionic group, and a case where the initiator contains the anionic group. Preferable containing ratio for each case will be described later.

Examples of a method for obtaining a particulate polymer containing an anion may include (1) a method wherein a monomer containing an anionic group is used as a polymerizable monomer; (2) a method wherein an emulsifying agent containing an anionic group is used for solubilization of a polymerizable monomer; (3) a method wherein an initiator containing an anionic group is used as a polymerization initiator; and (4) a method that is a combination of (1) to (3).

Examples of the monomer containing an anionic group may include a monomer having a carboxyl group, a monomer having a phosphonic acid group, a monomer having a phosphinic acid group, and a monomer having a sulfonic acid group. Among them, a monomer having a carboxyl group and a monomer having a sulfonic acid group are preferable from the viewpoints of stability of the particulate polymer.

Examples of the monomer having a carboxyl group may include ethylenic unsaturated carboxylic acids such as acrylic acid, methacrylic acid, itaconic acid, and fumaric acid.

Examples of the monomer having a sulfonic acid group may include 2-acrylamide-2-methylpropanesulfonic acid, 2-[(2-propenyloxy)methoxy]ethenesulfonic acid, 3-[(2-propenyloxy)-1-propene-1-sulfonic acid, vinylsulfonic acid, 2-vinylbenzenesulfonic acid, 3-vinylbenzenesulfonic acid, 4-vinylbenzenesulfonic acid, 4-vinylbenzylsulfonic acid, 2-methyl-1-pentene-1-sulfonic acid, and 1-octene-1-sulfonic acid.

The containing ratio of the monomer unit containing an anionic group relative to the total amount of particulate polymer is preferably 0.5% by weight or more, and more preferably 1% by weight or more, and preferably 10% by weight or less, and more preferably 5% by weight or less. When the containing ratio falls within the aforementioned range, the particulate polymer exerts electrostatic repulsion effect, whereby the stability in the formulation of the slurry for an electrode is improved. Further, the adhesion of the particulate polymer with a collector in the electrode is improved.

Examples of the emulsifying agent containing an anionic group may include anionic surfactants such as a surfactant having a carboxyl group, a surfactant having a sulfonic acid group, and a surfactant having a phosphoric acid group. Among them, a surfactant having a sulfonic acid group is preferable because of stability of the particulate polymer.

Examples of the surfactant having a sulfonic acid group may include sulfuric acid ester of higher alcohol, alkylbenzenesulfonates, and aliphatic sulfonates. Specific examples thereof may include benzenesulfonates such as sodium dodecylbenzenesulfonate and sodium dodecyl phenyl-ether-sulfonate; alkyl sulfates such as sodium laurylsulfate and sodium tetradodecylsulfate; sulfosuccinates such as sodium dioctylsulfosuccinate and sodium dihexylsulfosuccinate, ethoxy sulfates such as sodium polyoxyethylene lauryl ether sulfate and sodium polyoxyethylene nonyl-phenyl-ether sulfate; and alkanesulfonates.

As the emulsifying agent, the anionic surfactant may be used alone, and may also be used in combination with another surfactant.

Examples of other surfactants may include a nonionic surfactant, a cationic surfactant, and an amphoteric surfactant.

As the nonionic surfactant, publicly known surfactants may be used. Specific examples thereof may include alkyl ester-type, alkyl ether-type, and alkyl phenyl ether-type surfactants of polyethylene glycols.

As the cationic surfactant, publicly known surfactants may be used Specific examples thereof may include primary amine salts, secondary amine salts, tertiary amine salts, and quaternary ammonium salts.

Examples of the amphoteric surfactant may include surfactants having as an anionic moiety carboxylate salts, sulfuric acid ester salts, sulfonate salts, or phosphoric acid ester salts, and as a cationic moiety amine salts or quaternary ammonium salts. Specific examples thereof may include betaines such as lauryl betaine and stearyl betaine; and amino acid-type surfactants such as lauryl-β-alanine, stearyl-β-alanine, lauryl di(aminoethyl)glycine, and octyl di(aminoethyl)glycine.

The containing ratio of the emulsifying agent relative to the total amount of particulate polymer is preferably 0.05% by weight or more, and more preferably 0.1% by weight or more, and preferably 10% by weight or less, and more preferably 5% by weight or less. When the containing ratio falls within the aforementioned range, aggregation of the particulate polymer can be avoided even when the emulsifying agent is mixed with the polymer having a cationic group in the slurry for an electrode, and therefore stability can be maintained.

Examples of the polymerization initiator may include persulfates such as potassium persulfate and ammonium persulfate, hydrogen peroxide, and organic peroxides such as benzoyl peroxide, and cumene hydroperoxide. Further, they may be used alone, or used as a redox polymerization initiator in combination with reducing agents such as acidic sodium sulfite, sodium thiosulfate, ascorbic acid. In addition, azo compounds such as 2,2'-azobisisobutyronitrile, 2,2'-azobis(2,4-dimethylvaleronitrile), 2,2'-azobis(4-methoxy-2,4-dimethylvaleronitrile), dimethyl 2,2'-azobisisobutyrate, and 4,4'-azobis(4-cyanopentanoic acid); and amidine compounds such as 2,2'-azobis(2-aminodipropane) dihydrochloride, 2,2'-azobis(N,N'-dimethylene isobutyramidine), and 2,2'-azobis (N,N'-dimethylene isobutyramidine) dihydrochloride may be used. One species thereof may be solely used, or two or more thereof may be used in combination. Among them, persulfates such as potassium persulfate and ammonium persulfate, which contain an anionic group, are preferably used.

The containing ratio of the polymerization initiator relative to the total amount of particulate polymer is preferably 0.01% by weight or more, and more preferably 0.05% by weight or more, and preferably 5% by weight or less, and more preferably 3% by weight or less. When the containing ratio falls within the aforementioned range, aggregation of the particulate polymer can be avoided even when the initiator is mixed with the polymer having a cationic group in the slurry for an electrode, and therefore stability can be maintained.

Examples of the polymerization terminator may include diethylhydroxylamine, hydroxyaminesulfonic acid, and alkali metal salts thereof, hydroxyaminesulfate salts, hydroxydithiocarboxylic acid such as hydroxydimethylbenzenethiocarboxylic acid and hydroxydibutylbenzenethiocarboxylic acid, and alkali metal salts thereof, hydroquinone derivatives, and catechol derivatives. Among them, hydroxyaminesulfonic acid, and alkali metal salts thereof, hydroxydithiocarboxylic acid, and alkali metal salts thereof, which have an anionic group, are preferably used.

The containing ratio of the polymerization terminator relative to the total amount of particulate polymer is preferably 0.01% by weight or more, and more preferably 0.1% by weight or more, and preferably 2% by weight or less, and more preferably 1% by weight or less. When the containing ratio falls within the aforementioned range, aggregation of the particulate polymer can be avoided even when the terminator is mixed with the polymer having a cationic group in the slurry for an electrode, and therefore stability can be maintained.

The containing ratio of the anion in the particulate polymer is calculated from the ratio of the component of structure having an anionic group in the particulate polymer, and is preferably 0.25% by weight or more, more preferably 0.5% by weight or more, and particularly preferably 1% by weight or more, and preferably 20% by weight or less, more preferably 10% by weight or less, and particularly preferably 8% by weight or less.

The particulate polymer used in the electrode for a secondary battery of the present invention may be produced by, e.g., emulsion polymerization, or suspension polymerization. As the emulsion polymerization, any publicly known method may be adopted. The production may be performed in the aqueous medium using, e.g., an emulsifying agent, a polymerization initiator, and a molecular weight modifier.

The binder dispersion liquid may be an aqueous dispersion liquid (aqueous binder) in which the dispersion medium is water, or a non-aqueous dispersion liquid (non-aqueous binder) in which the dispersion medium is an organic solvent. From the viewpoint of compatibility with the polymer having a cationic group and the anion corresponding to the cationic group of the present invention, the aqueous binder is preferably used.

For example, the aqueous dispersion liquid may be produced by emulsion polymerization of the aforementioned monomer in water. The non-aqueous dispersion liquid may be produced by replacement treatment of the aqueous dispersion liquid with an organic solvent. The number mean particle diameter of the particulate polymer in the binder dispersion liquid is preferably 50 nm or larger, and more preferably 70 nm or larger, and preferably 500 nm or smaller, and more preferably 400 nm or smaller. When the number mean particle diameter of the particulate polymer falls within this range, the strength and flexibility of the obtained electrode become favorable.

The glass transition temperature (Tg) of the particulate polymer is optionally selected depending on the purpose of use, and is usually $-150°$ C. or higher, preferably $-100°$ C. or higher, more preferably $-70°$ C. or higher, further preferably $-50°$ C. or higher, and particularly preferably $-35°$ C. or higher, and usually $+100°$ C. or lower, preferably $+25°$ C. or lower, and further preferably $+5°$ C. or lower. When Tg of the particulate polymer falls within this range, the characteristics such as flexibility, binding properties, and winding properties of the electrode and adhesion of the electrode active material layer with a collector are highly balanced, and therefore such a particulate polymer is suitable.

The amount of the particulate polymer in the electrode for a secondary battery of the present invention is preferably 0.1 parts by weight or more, more preferably 0.2 parts by weight or more, and particularly preferably 0.5 parts by weight or more, and preferably 5 parts by weight or less, more preferably 4 parts by weight or less, and particularly preferably 3 parts by weight or less relative to 100 parts by weight of the electrode active material. When the amount of the particulate polymer in the electrode active material layer falls within the range, the electrode active material can be prevented from separating from the electrode while avoiding inhibition of the battery reaction.

In the present invention, the weight ratio of the polymer having a cationic group relative to the particulate polymer in the electrode active material layer is preferably 5:95 to 40:60, and more preferably 10:90 to 30:70. When the polymer having a cationic group and the particulate polymer are used in the aforementioned weight ratio, aggregation of the polymer having a cationic group and the particulate polymer can be avoided, and therefore the advantageous effects of the present invention can be obtained.

(Other Components)

The electrode for a secondary battery of the present invention may contain, in addition to the aforementioned components, other components such as a conducting agent, a reinforcement material, a dispersant, a leveling agent, an antioxidant, a thickener, and an electrolytic solution additive that has a function for, e.g., suppressing decomposition of electrolytic solution. These other components may be contained in the slurry for a secondary battery electrode which will be described later. These components are not particularly limited as long as they do not affect the battery reaction.

As the conducting agent, conductive carbon such as acetylene black, ketjen black, carbon black, graphite, vapor grown carbon fiber, and carbon nanotube may be used. Examples thereof may include carbon powder such as black lead, and fiber or foil of a variety of metals. Use of the conducting agent can improve the electrical contact between the electrode active materials. In particular, when the conducting agent is used in a lithium ion secondary battery, the discharge load characteristics can be improved.

As the reinforcement material, a variety of inorganic or organic spherical, plate-like, rod-like, or fibrous fillers may be used. Use of the reinforcement material can provide a tough and flexible electrode, with which excellent long-term cycle characteristics can be obtained.

The containing ratio of the conducting agent or a reinforcement agent in the electrode active material layer is usually 0.01 parts by weight or more, and preferably 1 part by weight or more, and usually 20 parts by weight or less, and preferably 10 parts by weight or less, relative to 100 parts by weight of the electrode active material. When the content of the agent falls within this range, the battery with the electrode can exhibit high capacity and high load characteristics.

Examples of the dispersant may include an anionic compound, a cationic compound, a nonionic compound, and a macromolecular compound. The dispersants are selected depending on the electrode active material and conducting agent to be used. The containing ratio of the dispersant in the electrode active material layer is preferably 0.01 to 10 parts by weight relative to 100 parts by weight of the electrode active material. When the containing ratio of the dispersant in the electrode active material layer falls within this range, the resulting slurry for an electrode thereby acquires excellent stability, whereby a smooth electrode can be obtained, and the resulting battery can have high battery capacity.

Examples of the leveling agent may include surfactants such as an alkyl surfactant, a silicone surfactant, a fluorine surfactant, and a metal surfactant. Addition of the surfactant can prevent repellency generated during coating, and can improve the smoothness of the electrode. The containing ratio of the leveling agent in the electrode active material layer is preferably 0.01 to 10 parts by weight relative to 100 parts by weight of the electrode active material. When the containing ratio of the leveling agent in the electrode active material layer falls within this range, the productivity during manufacture of electrodes, the smoothness, and the battery characteristics become excellent.

Examples of the antioxidant may include phenol compounds, hydroquinone compounds, organic phosphorus compounds, sulfur compounds, phenylene diamine compounds, and polymer-type phenol compounds. The polymer-type phenol compound is a polymer having a phenol structure in the molecule, and a polymer-type phenol compound having a weight mean molecular weight of usually 200 or more, and preferably 600 or more, and usually 1000 or less, and preferably 700 or less, is preferably used. The containing ratio of the antioxidant in the electrode active material layer is preferably 0.01 parts by weight or more, and more preferably 0.05 parts by weight or more, and preferably 10 parts by weight or less, and preferably 5 parts by weight or less, relative to 100 parts by weight of the electrode active material. When the containing ratio of the antioxidant in the electrode active material layer falls within this range, the stability of the slurry for an electrode, the battery capacity, and the cycle characteristics become excellent.

Examples of the thickener may include cellulose polymer such as carboxymethyl cellulose, methyl cellulose, and hydroxypropyl cellulose, and ammonium salts and alkali metal salts thereof; (modified) poly(meth)acrylic acid and ammonium salts and alkali metal salts thereof; polyvinyl alcohols such as (modified) polyvinyl alcohol, or a copolymer of acrylic acid or acrylate salt and vinyl alcohol, and a copolymer of maleic anhydride, maleic acid, or fumaric acid and vinyl alcohol; polyethylene glycol, polyethylene oxide, polyvinyl pyrrolidone, modified polyacrylic acid, oxide starch, phosphate starch, casein, a variety of modified starch, and acrylonitrile-butadiene copolymerized hydride. In the present invention, "(modified) poly" means "unmodified poly" or "modified poly," and "(meth)acryl" means "acryl" or "methacryl". The containing ratio of the thickener in the electrode active material layer is preferably 0.01 to 10 parts by weight relative to 100 parts by weight of the electrode active material. When the containing ratio of the thickener in the electrode active material layer falls within this range, the dispersibility of electrode active materials in the slurry for an electrode becomes excellent and thereby a smooth electrode can be obtained, and excellent load characteristics and cycle characteristics are exerted.

The electrolytic solution additive for use may be vinylene carbonate which is, as will be described later, used in the slurry for an electrode and the electrolytic solution. The containing ratio of the electrolytic solution additive in the electrode active material is preferably 0.01 to 10 parts by weight relative to 100 parts by weight of the electrode active material. When the containing ratio of the electrolytic solution additive in the electrode active material layer is within this range, cycle characteristics and high-temperature characteristics become excellent.

Examples of other components may include nano fine particles such as fumed silica and fumed alumina: and surfactants such as an alkyl surfactant, a silicone surfactant, a fluorine surfactant, and a metal surfactant.

By addition of the nano fine particles, thixotropy of the slurry for an electrode can be controlled, and leveling properties of the electrode thus obtained can thus be improved. The containing ratio of the nano fine particles in the electrode active material layer is preferably 0.01 to 10 parts by weight relative to 100 parts by weight of the electrode active material. When the containing ratio of the nano fine particles in the electrode active material layer falls within this range, the stability of the slurry for an electrode and productivity become excellent, and high battery characteristics are exerted.

Addition of the surfactant can improve dispersibility of the electrode active materials in the slurry for an electrode, and smoothness of the resulting electrode can thus be improved. The containing ratio of the surfactant in the electrode active material is preferably 0.01 to 10 parts by weight relative to 100 parts by weight of the electrode active material. When the containing ratio of the surfactant in the electrode active material falls within this range, stability of the slurry for an electrode and electrode smoothness become excellent, and high productivity is exerted.

(Collector)

In the electrode for a secondary battery of the present invention, the electrode active material layer containing a polymer having a cationic group, a counter anion corresponding to the cationic group, and an electrode active material may be formed on a collector.

The collector is not particularly limited as long as a material thereof has an electric conductivity and an electrochemical durability, and from the viewpoints of heat resistance, it is preferable that the material is a metal material such as iron, copper, aluminum, nickel, stainless steel, titanium, tantalum, gold, and platinum. Among them, aluminum is particularly preferable for a positive electrode of a lithium ion secondary battery, and copper is particularly preferable for a negative electrode of a lithium ion secondary battery. The form of the collector is not particularly limited, and is preferably in a form of a sheet having a thickness of about 0.001 to 0.5 mm. It is preferable that the collector is previously roughened before use, to thereby enhance adhesion strength of the electrode. Examples of roughening method may include a mechanical polishing method, an electrolysis polishing method, and a chemical polishing method. In the mechanical polishing method, abrasive cloth paper on which abrasive particles are fixed, a grinder stone, an emery wheel, a wire brush equipped with steel lines, or the like is used. Further, in order to enhance the adhesion strength and conductivity of the electrode, an intermediate layer may be formed on the surface of the collector.

(Method for Manufacturing Electrode)

The method for manufacturing the electrode for a secondary battery of the present invention may be a method wherein an electrode active material layer in a layer form is bound on at least one side, or preferably both sides of the collector. For example, the slurry for an electrode, which will be described later, is applied to the collector, dried, and then heated at 120° C. or higher for 1 hours or longer to form an electrode. The method for applying the slurry for an electrode to the collector is not particularly limited. Examples of the method may include a doctor blade method, a dip method, a reverse roll method, a direct roll method, a gravure method, an extrusion method, and a brush coating method. Examples of the drying method may include drying by warm wind, hot wind, or low humidity wind, vacuum drying, drying by radiation with, e.g., (far-) infrared ray and electron beam.

It is preferable that pressurization is performed using die press, roll press, or the like to decrease porosity of the electrode. The preferable range of porosity is preferably 5% or more, and more preferably 7% or more, and preferably 15% or less, and more preferably 13% or less. Too high porosity deteriorates charge efficiency and discharge efficiency. When the porosity is too low, there occur problems such as difficulty in obtaining high volume capacity, and high tendency of peeling of the electrode to cause defects. Further, when a curable polymer is used, it is preferable that the polymer is cured.

The thickness of the electrode for a secondary battery of the present invention is usually 5 µm or more, and preferably 10 µm or more, and usually 300 µm or less, and preferably 250 µm or less, in both cases wherein the electrode is a positive electrode and wherein the electrode is a negative electrode. When the thickness of the electrode falls within the range, both load characteristics and energy density become at high levels.

(Slurry for Secondary Battery Electrode)

The slurry for a secondary battery electrode of the present invention contains a polymer having a cationic group, a counter anion corresponding to the cationic group, an electrode active material, and a solvent. Examples of the polymer having a cationic group, the counter anion corresponding to the cationic group, and the electrode active material may include those enumerated in the description of the electrode.

(Solvent)

The solvent used in the slurry for an electrode is not particularly limited as long as the solid contents (the polymer having a cationic group, the counter anion corresponding to the cationic group, the electrode active material, and other components) can be uniformly dispersed therein.

The solvent used in the slurry for an electrode may be any of water and an organic solvent. Examples of the organic solvent may include cyclic aliphatic hydrocarbons such as cyclopentane and cyclohexane; aromatic hydrocarbons such as toluene, xylene, and ethylbenzene; ketones such as acetone, ethyl methyl ketone, diisopropyl ketone, cyclohexanone, methyl cyclohexane, and ethyl cyclohexane; chlorine-based aliphatic hydrocarbons such as methylene chloride, chloroform, and carbon tetrachloride; esters such as ethyl acetate, butyl acetate, γ-butyrolactone, and ε-caprolactone; acylonitriles such as acetonitrile and propionitrile; ethers such as tetrahydrofuran and ethylene glycol diethyl ether: alcohols such as methanol, ethanol, isopropanol, ethylene glycol, and ethylene glycol monomethyl ether; and amides such as N-methylpyrrolidone and N,N-dimethylformamide.

One of these solvents may be solely used. Alternatively, two or more species thereof may be mixed and used as a mixed solvent. Among them, a solvent which has excellent solubility of the polymer of the present invention, excellent dispersibility of the electrode active material and the conducting agent, low boiling point, and high volatility is particularly preferable since such a solvent can be removed for a short period of time at a low temperature. Acetone, toluene, cyclohexanone, cyclopentane, tetrahydrofuran, cyclohexane, xylene, water, or N-methylpyrrolidone, or a mixed solvent thereof is preferable. Water is particularly preferable.

The solid content concentration of the slurry for a secondary battery electrode of the present invention is not particularly limited as long as the viscosity is at a degree that enables applying and immersing, and the slurry has fluidity. The solid content concentration is generally about 10 to 80% by weight.

Further, the slurry for a secondary battery electrode may contain other components that are used in the electrode such as dispersants and electrolytic solution additives having a function such as suppression of decomposition of electrolytic solution, in addition to the polymer having a cationic group, the counter anion corresponding to the cationic group, the electrode active material, and the solvent. These are not particularly limited as long as these do not affect the battery reaction.

(Method for Producing Slurry for Secondary Battery Electrode)

In the present invention, a method for producing the slurry for a secondary battery electrode is not particularly limited. The slurry may be obtained by mixing a polymer having a cationic group, a counter anion corresponding to the cationic group, an electrode active material, and a solvent, and if needed, other components to be added.

In the present invention, by using the aforementioned components, a slurry for an electrode in which electrode active materials and conducting agents are highly dispersed can be obtained regardless of mixing methods and mixing orders. The device for mixing is not particularly limited as long as the device is capable of uniformly mixing the components, and a bead mill, a ball mill, a roll mill, a sand mill, a pigment disperser, a crush grinder, an ultrasonic disperser, a homogenizer, a planetary mixer, and a FILMIX mixer may be used. Among them, it is particularly preferable to use a ball mill, a roll mill, a pigment disperser, a crush grinder, or a planetary mixer since those enable dispersion at high concentration.

From the viewpoint of the uniform coating properties and stability of a slurry for an electrode with the lapse of time, the viscosity of the slurry for an electrode is preferably 10 mPa·s or more, and more preferably 100 mPa·s or more, and preferably 100,000 mPa·s or less, and more preferably 50,000 mPa·s or less. The viscosity is a value measured with a Brookfield type viscometer at 25° C. and a rotation number of 60 rpm.

(Secondary Battery)

The secondary battery of the present invention includes a positive electrode, a negative electrode, a separator, and an electrolytic solution, wherein at least one of the positive electrode and the negative electrode consists of the electrode containing the electrode active material layer including the polymer having the cationic group, the counter anion corresponding to the cationic group, and the electrode active material.

Examples of the secondary battery of the present invention may include a lithium ion secondary battery and a nickel metal hydride secondary battery. The lithium ion secondary battery is preferable in the light of the strongest demand for improving safety, the highest effect of low-temperature characteristics improvement, and demand for expanding operation temperature region. An example of use as the lithium ion secondary battery will be described below.

(Separator for Lithium Ion Secondary Battery)

As the separator, publicly known separators such as a microporous membrane or nonwoven fabric which is made of polyolefin such as polyethylene and polypropylene; and a porous resin coating containing inorganic ceramic powder may be used.

As a separator for a lithium ion secondary battery, publicly known separators such as a microporous membrane or nonwoven fabric containing polyolefin resin such as polyethylene and polypropylene, and aromatic polyamide resin; and a porous resin coating containing inorganic ceramic powder may be used. Examples thereof may include microporous membranes made of resin of polyolefin-based polymer (polyethylene, polypropylene, polybutene, polyvinyl chloride), and mixtures or copolymers thereof, microporous membranes made of resin of polyethylene terephthalate, polycycloolefin, polyethersulfone, polyamide, polyimide, polyimideamide, polyaramide, polycycloolefin, nylon, or polytetrafluoroethylene, or woven materials made of polyolefin fibers, or nonwoven fabrics thereof, and an aggregate of insulating substance particles. Among them, a microporous membrane made of polyolefin resin is preferable since total film thickness of the separator can be thereby reduced and the ratio of the electrode active material in a battery can be increased, to thereby increase the capacity per volume.

The thickness of the organic separator is usually 0.5 μm or more, and preferably 1 μm or more, and usually 40 μm or less, preferably 30 μm or less, and more preferably 10 μm or less. When the thickness falls within this range, the resistance caused by the separator in the battery is decreased, and the workability during manufacture of batteries is improved.

(Electrolytic Solution for Lithium Ion Secondary Battery)

As an electrolytic solution for a lithium ion secondary battery, an organic electrolytic solution in which supporting electrolyte is dissolved in an organic solvent is used. As the supporting electrolyte, a lithium salt is used. The lithium salt is not particularly limited, and examples thereof may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_6SO_2)NLi$. Among them, preferable are $LiPF_6$, $LiClO_4$, and $CF_3SO_3Li$ which are soluble in a solvent and exhibit high dissociation ratio. Two or more species thereof may be used in combination. Use of the supporting electrolyte having high dissociation ratio results in increase in lithium ion conductivity, and therefore the lithium ion conductivity can be adjusted by selecting the species of the supporting electrolyte.

An organic solvent used in the electrolytic solution for a lithium ion secondary battery is not particularly limited as long as the supporting electrolyte can be dissolved therein. Preferred examples of the organic solvents for use may include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethylsulfoxide. Further, a mixture of these solvents may also be used. Among them, preferable are carbonates because of high permittivity and a wide and stable electric potential region. Use of a solvent having a lower viscosity results in increase in the lithium ion conductivity, and therefore the lithium ion conductivity can be adjusted by selecting the species of the supporting electrolyte.

Further, additives may be added to the electrolytic solution. Examples of the additives may include carbonate compounds such as vinylene carbonate (VC) used in the slurry for a secondary battery electrode.

The concentration of the supporting electrolyte in the electrolytic solution for a lithium ion secondary battery is usually 1% by weight or more, and preferably 5% by weight or more, and usually 30% by weight or less, and preferably 20% by weight or less. Further, the supporting electrolyte is used usually in a concentration of 0.5 to 2.5 mol/L depending on the species of the supporting electrolyte. The ion conductivity tends to decrease in both cases wherein the concentration of the supporting electrolyte is too low and too high.

Examples of electrolytic solutions other than those mentioned above may include polymer electrolyte such as polyethylene oxide and polyacrylonitrile, gel-like polymer electrolyte in which the polymer electrolyte is impregnated with an electrolytic solution, and inorganic solid electrolyte such as LiI, and $Li_3N$.

Specific examples of the method for manufacturing a lithium ion secondary battery may include a method in which a positive electrode and a negative electrode are stacked with a separator interposed therebetween, this stack is wound or folded in conformity with the battery shape and then placed in a battery case, an electrolytic solution is poured in the battery case, and then the battery case is sealed. If necessary, expanded metal, overcurrent prevention elements such as fuses and PTC elements, and lead plates are placed in the battery case, to prevent increase in pressure inside the battery and overcharge and overdischarge. The shape of the battery may be in any of coin, button, sheet, cylinder, square, or flat shape.

(Addendum)

In order to solve the aforementioned problems, the present inventors have conducted intensive studies, and as a result, found out that suppression of the lithium deposition and improvement in low-temperature discharge capacity of the resulting secondary battery can be achieved by addition of a polymer having a cationic group and a particulate polymer to the electrode containing the electrode active material.

When the polymer having a cationic group exists on the surface of the electrode active material, the mobility of lithium ion is improved. However, when the surface of the electrode active material is completely covered with the polymer having a cationic group, this becomes a resistance element. When the particulate polymer and the polymer having a cationic group are used in combination, a composite of the particulate polymer and the polymer having a cationic group is partially formed. The presence of the composite avoids complete covering of the surface with the electrode active material, whereby an approach route of lithium ion to the surface of the electrode active material can be selectively secured, and the effect of improvement in mobility of thium ion due to the polymer having a cationic group can be maintained. Accordingly, the deposition of lithium metal to the electrode surface is suppressed.

Based on these findings, the following additional inventions are created.

[I] An electrode for a secondary battery having an electrode active material layer containing a polymer having a cationic group, a particulate polymer, and an electrode active material.

[II] The aforementioned electrode for a secondary battery, wherein the weight ratio of the polymer having a cationic group relative to the particulate polymer in the electrode active material layer is 5:95 to 40:60.

[III] The aforementioned electrode for a secondary batter, wherein the particulate polymer contains an anion.

[IV] The aforementioned electrode for a secondary battery, wherein the glass transition temperature of the particulate polymer is 25° C. or lower.

[V] The aforementioned electrode for a secondary battery, wherein the cationic group contains a heteroatom.

[VI] The aforementioned electrode for a secondary battery, wherein the heteroatom contains one or more of nitrogen, phosphorus, sulfur, oxygen, and boron.

[VII] The aforementioned electrode for a secondary battery, wherein the weight mean molecular weight of the polymer having a cationic group is 1,000 to 500,000.

[VIII] A slurry for a secondary battery electrode containing a polymer having a cationic group, a particulate polymer, an electrode active material, and a solvent.

[IX] A method for manufacturing an electrode for a secondary battery including a step of applying the aforementioned slurry for a secondary battery electrode to a collector and drying it.

[X] A secondary battery including a positive electrode, a negative electrode, a separator, and an electrolyte, wherein at least one of the positive electrode and the negative electrode is the aforementioned electrode.

The electrode for a secondary battery according to the additional invention is the same as the electrode for a secondary battery of the present invention except that the electrode active material layer requisitely contains a particulate polymer, and may not requisitely contain a counter anion corresponding to the cationic group, and that the cation density in the polymer having a cationic group is not limited to 0.1 to 15 meq/g.

The slurry for a secondary battery electrode according to the additional invention is the same as the slurry for a secondary battery electrode of the present invention except that the slurry requisitely contains a particulate polymer, and may not requisitely contain a counter anion corresponding to the cationic group, and that the cation density in the polymer having a cationic group is not limited to 0.1 to 15 meq/g.

Further, the method for manufacturing an electrode for a secondary battery according to the additional invention is the same as the method for manufacturing an electrode for a secondary battery of the present invention except that the slurry for a secondary battery electrode according to the additional invention is used in place of the slurry for a secondary battery electrode of the present invention.

Further, the secondary battery according to the additional invention is the same as the secondary battery of the present invention except that the electrode for a secondary battery according to the additional invention is used in place of the electrode for a secondary battery of the present invention.

According to the aforementioned additional invention, the polymer having a cationic group and the particulate polymer are added to the electrode active material layer. In the electrode for the secondary battery, these polymers suppress resistance on the surface of electrode active material during insertion of lithium, to thereby prevent lithium deposition on the electrode surface. The resulting secondary battery thereby exhibits a high charge capacity at temperatures including a low temperature range of 0° C. or lower.

EXAMPLES

Hereinafter, the present invention will be described by way of examples, but the present invention is not limited to the examples. Unless otherwise specified, parts, %, and ppm which represent an amount in the examples are on a weight basis. In addition, percent representation in parenthesis following the reagent name, for example "(40%)" in "acrylamide (40%)", indicates the concentration in an aqueous solution.

In the Examples and Comparative Examples, properties are evaluated as follows.
(Cation Density—CV Value)

90 ml of distilled water is placed in a beaker. 10 ml of aqueous solution of polymer having a cationic group which had been prepared to a concentration of 500 ppm was added thereto, and the pH of the mixture is adjusted to 3.0 or lower with a 1N (1 mol/l) HCl solution. After stirring for about 1 minute, a few drops of toluidine blue indicator was added, and titration was performed using N/400 (0.0025 mol/l) PVSK (potassium polyvinyl sulfate) solution. CV value was then calculated by the following equation. This test method is referred to as a colloidal titration method.

CV (meq/g)=Titration amount of N/400 PVSK solution× Titer of N/400 PVSK solution×½

For a quaternary compound, the CV value is calculated by addition of the titration amount of N/400 PVSK solution to a blank titration amount.
(Rate of Change of Slurry Viscosity)

A rate of change of slurry viscosity was calculated from a slurry viscosity 1 hour after production of a slurry for an electrode ($\eta_{1h}$) and a slurry viscosity 5 hours after the production ($\eta_{5h}$) by the following equation, and evaluated in accordance with the following criteria.

Rate of change of slurry viscosity(%)= 100×($\eta_{5h}$−$\eta_{1h}$)/$\eta_{1h}$ A low value indicates high stability of the slurry.
A: smaller than 5%
B: 5% or greater and smaller than 10%
C: 10% or greater and smaller than 15%
D: 15% or greater and smaller than 20%
E: 20% or greater and smaller than 25%
F: 25% or greater Herein, the viscosity of slurry was measured in accordance with JIS Z8803:1991 by a single cylinder rotation viscometer (25° C., rotation number=60 rpm, spindle shape: 4).

(Peel Strength)

An electrode was cut out to obtain a rectangle of 1 cm in width×10 cm in length as a sample, and the sample was fixed with a face of an electrode active material layer up. A cellophane tape was attached to the surface of the electrode active material layer of the sample. The cellophane tape was peeled off from an end of the sample at a speed of 50 mm/min in a 180°-direction, and the stress upon peeling was measured. The measurement was performed 10 times, and a mean value was calculated. The mean value was taken as the peel strength and evaluated in accordance with the following criteria. A great value indicates high adhesion strength of the electrode plate.
A: 6 N/m or greater
B: 5 N/m or greater to smaller than 6 N/m
C: 4 N/m or greater to smaller than 5 N/m
D: 3 N/m or greater to smaller than 4 N/m
E: 2 N/m or greater to smaller than 3 N/m
F: smaller than 2 N/m
(Charge and Discharge Characteristics)
(1) Low-Temperature Characteristics (0° C.)

The obtained negative electrode half-cell was subjected to constant current constant voltage electric charge at 25° C. and a charge and discharge rate of 0.1 C, to be charged to 0.2 V at constant current and then charged at constant voltage. After charging, discharge was performed down to 1.5 V. The charge and discharge were repeated two times, and then constant current constant voltage charge was performed at 0.1 C in a constant temperature bath set to 0° C. The battery capacity obtained under the constant current in this constant current constant voltage charging was taken as an index of lithium receiving properties, and evaluated in accordance with the following criteria. A great value indicates good low-temperature characteristics and good lithium receiving properties of the battery.
A: 220 mAh/g or greater
B: 200 mAh/g or greater and smaller than 220 mAh/g
C: 180 mAh/g or greater and smaller than 200 mAh/g
D: 160 mAh/g or greater and smaller than 180 mAh/g
E: 140 mAh/g or greater and smaller than 160 mAh/g
F: smaller than 140 mAh/g
(2) Low-Temperature Characteristics (−30° C.)

The obtained negative electrode half-cell was subjected to constant current constant voltage electric charge at 25° C. and a charge and discharge rate of 0.1 C, to be charged to 0.2 V at constant current and then charged at constant voltage. After charging, discharge was performed down to 1.5 V. The charge and discharge were repeated two times, and then constant current constant voltage charge was performed at 0.1 C in a constant temperature bath set to −30° C. The battery capacity obtained under the constant current in this constant current constant voltage charging was taken as an index of lithium receiving properties, and evaluated in accordance with the following criteria. A great value indicates good low-temperature characteristics and good lithium receiving properties of the battery.
A: 60 mAh/g or greater
B: 50 mAh/g or greater and smaller than 60 mAh/g
C: 40 mAh/g or greater and smaller than 50 mAh/g
D: 20 mAh/g or greater and smaller than 40 mAh/g
E: 10 mAh/g or greater and smaller than 20 mAh/g
F: smaller than 10 mAh/g
(3) Deposition Amount of Li Metal In the same manner as the aforementioned method, charge and discharge of the obtained negative electrode half-cell were repeated at 0.1 C, and then charge was performed at 0.1 C in a constant temperature layer set to 0° C. After charging, the half-cell was disassembled, and the shape of the negative electrode surface was observed. Ten cells were tested in each case, and the number of cells in which the deposition of lithium can be visually observed was counted. A small number of cells on which deposition of lithium was observed indicates suppression of deposition of lithium metal.

A: 0 cell
B: 1 to 2 cells
C: 3 to 5 cells
D: 6 to 8 cells
E: 9 cells or more (4) Positive Electrode Low-Temperature Characteristics (0° C.)

The obtained positive electrode half-cell was charged by a constant current method at 25° C. and a charge and discharge rate of 0.2 C, to 4.3 V. After charging, discharge was performed down to 3.0 V. The charge and discharge were repeated two times, and then constant current charge was performed at 0.1 C in the constant temperature bath set to 0° C. A positive electrode low-temperature characteristics represented by a ratio (%) of a charge capacity obtained by 0° C. constant current charge relative to a charge capacity obtained by 25° C. low current charge was calculated, and evaluated in accordance with the following criteria. A great value indicates good low-temperature characteristics.

A: 70% or greater
B: 50% or greater and smaller than 70%
C: 30% or greater and smaller than 50%
D: smaller than 30%

<Production of Polymer>
(Polymer A)

In a reactor vessel equipped with a reflux condenser, a thermometer, a dropping funnel, a stirrer, and a gas inlet tube, 400 parts of diallyldimethylammonium chloride (60%), 40 parts of acrylamide (40%), and 250 parts of ion exchanged water were placed. The temperature in the system was elevated to 70° C. with nitrogen gas flowing. Under stirring, 30 parts of ammonium persulfate (25%) as a polymerization initiator was added dropwise over 4 hours using the dropping funnel. After completion of dropwise addition, the reaction was continued for additional 1 hour to obtain a viscous pale yellow liquid.

When this viscous liquid was poured into another vessel in which 500 parts of acetone had been placed, a white precipitate was generated. The precipitate was collected by filtration, and sufficiently washed twice with 100 parts of acetone. Then, the precipitate was dried in vacuo to obtain a white solid as a polymer A.

The yield of the polymer A was 80%.

The cation density of the polymer A which was determined by the colloidal titration method was 5.9 meq/g.

In addition, the weight mean molecular weight of the polymer A which was determined by GPC (developing solvent: sodium nitrate aqueous solution, standard substance: polyethylene oxide) was about 200,000.

Further, all weight mean molecular weights which will be described later were measured using a sodium nitrate aqueous solution as a developing solvent and polyethylene oxide a standard substance.

(Polymer B)

In a reactor vessel equipped with a reflux condenser, a thermometer, a dropping funnel, a stirrer, and a gas inlet tube, 500 parts of N-methyldiallylamine hydrochloride (60%) and 50 parts of ion exchanged water were placed. The temperature in the system was elevated to 80° C. with nitrogen gas flowing. Under stirring, 30 parts of ammonium persulfate (25%) as a polymerization initiator was added dropwise over 4 hours using the dropping funnel. After completion of dropwise addition, the reaction was continued for additional 1 hour to obtain a viscous pale yellow liquid.

When this viscous liquid was poured into another vessel in which 500 parts of acetone had been placed, a white precipitate was generated. The precipitate was collected by filtration, sufficiently washed twice with 100 parts of acetone, and then dried in vacuo to obtain a white solid as a polymer B.

The yield of the polymer B was 78%.

The cation density of the polymer B which was determined by the colloidal titration method was 6.8 meq/g.

Further, the weight mean molecular weight of the polymer B which was determined by GPC was about 20,000.

(Polymer C)

In a reactor vessel equipped with a reflux condenser, a thermometer, a dropping funnel, a stirrer, and a gas inlet tube, 400 parts of diallyldimethylammonium ethyl sulfate (60%) and 50 parts of ion exchanged water were placed. The temperature in the system was elevated to 80° C. with nitrogen gas flowing. Under stirring, 30 parts of ammonium persulfate (25%) as a polymerization initiator was added dropwise over 4 hours using the dropping funnel. After completion of dropwise addition, the reaction was continued for additional 1 hour to obtain a viscous pale yellow liquid.

When this viscous liquid was poured into another vessel in which 500 parts of acetone had been placed, a white precipitate was generated. The precipitate was collected by filtration, sufficiently washed twice with 100 parts of acetone, and then dried in vacuo to obtain a white solid as a polymer C.

The yield of the polymer C was 75%.

The cation density of the polymer C which was determined by the colloidal titration method was 4.2 meq/g.

Further, the weight mean molecular weight of the polymer C which was determined by GPC was about 37,000.

(Polymer D)

In a reactor vessel equipped with a reflux condenser, a thermometer, a dropping funnel, a stirrer, and a gas inlet tube, 150 parts of aqueous solution of N,N-dimethylaminopropylacrylamide methyl chloride-quaternary salt (available from KOHJIN CO., Ltd., DMAPAA-Q, 75% aqueous solution) was placed. Then ion exchanged water was added thereto to prepare a mixture having a monomer concentration of 30%. Further, 2 parts of polyoxyethylene alkyl ether (available from Kao Corporation, EMULGEN 1150S-60) was added, and mixed by stirring to prepare an emulsion.

Then the temperature in the system was elevated to 60° C. with nitrogen gas flowing, and 0.2 part of a water soluble azo polymerization initiator (available from Wako Pure Chemical Industries, Ltd., VA-050) was added as a polymerization initiator to initiate a reaction. The reaction was continued at 60° C. for 4 hours. Then the temperature was elevated to 80° C., and the reaction was continued for 4 hours. Then the reaction was terminated by cooling. In this manner, a polymer D was obtained. The polymerization conversion ratio determined from solid content concentration was 96%.

The cation density of the polymer D which was determined by the colloidal titration method was 4.8 meq/g.

Further, the weight mean molecular weight of the polymer D which was determined by GPC was about 50,000.

(Polymer E)

In a reactor vessel equipped with a reflux condenser, a thermometer, a dropping funnel, a stirrer, and a gas inlet tube, 150 parts of aqueous solution of N,N-dimethylaminoethylacrylate methyl chloride-quaternary salt (available from KOHJIN CO., Ltd., DMAEA-Q, 79% aqueous solution) was placed. Then ion exchanged water was added thereto to prepare a mixture having a monomer concentration of 30%.

Further, 2 parts of polyoxyethylene alkyl ether (available from Kao Corporation, EMULGEN 1150S-60) was added, and mixed by stirring to prepare an emulsion.

Then the temperature in the system was elevated to 60° C. with nitrogen gas flowing, and 0.2 part of a water soluble azo polymerization initiator (available from Wako Pure Chemical Industries, Ltd., VA-050) was added as a polymerization initiator to initiate a reaction. The reaction was continued at 60° C. for 4 hours. Then the temperature was elevated to 80° C., and the reaction was continued for 4 hours. Then the reaction was terminated by cooling. In this manner, a polymer E was obtained. The polymerization conversion ratio determined from solid content concentration was 95%.

The cation density of the polymer E which was determined by the colloidal titration method was 5.2 meq/g.

Further, the weight mean molecular weight of the polymer E which was determined by GPC was about 80,000.

(Polymer F)

In a reactor vessel equipped with a reflux condenser, a thermometer, a dropping funnel, a stirrer, and a gas inlet tube, 400 parts of diallylmethylethylammonium ethyl sulfate (60%) and 200 parts of maleic acid (40%) were placed. The temperature in the system was elevated to 65° C. with nitrogen gas flowing. Under stirring, 30 parts of ammonium persulfate (25%) as a polymerization initiator was added dropwise over 6 hours using the dropping funnel. After completion of dropwise addition, the reaction was continued for additional 2 hours to obtain a viscous pale yellow liquid.

When this viscous liquid was poured into another vessel in which 500 parts of acetone had been placed, a white precipitate was generated. The precipitate was collected by filtration, sufficiently washed twice with 100 parts of acetone, and then dried in vacuo to obtain a white solid as a polymer F.

The yield of the polymer F was 80%.

The cation density of the polymer F which was determined by the colloidal titration method was 2.6 meq/g.

Further, the weight mean molecular weight of the polymer F which was determined by GPC was about 10,000.

(Polymer G)

In a reactor vessel equipped with a reflux condenser, a thermometer, a dropping funnel, a stirrer, and a gas inlet tube, 400 parts of diallyldimethylammonium chloride (60%), 40 parts of acrylamide (40%), and 250 parts of ion exchanged water were placed. The temperature in the system was elevated to 80° C. with nitrogen gas flowing. Under stirring, 30 parts of ammonium persulfate (25%) as a polymerization initiator was added dropwise over 3 hours using the dropping funnel. After completion of dropwise addition, the reaction was continued for additional 1 hour to obtain a viscous pale yellow liquid.

When this viscous liquid was poured into another vessel in which 500 parts of acetone had been placed, a white precipitate was generated. The precipitate was collected by filtration, sufficiently washed twice with 100 parts of acetone, and then dried in vacuo to obtain a white solid as a polymer G.

The yield of the polymer G was 85%.

The cation density of the polymer G which was determined by the colloidal titration method was 5.9 meq/g.

Further, the weight mean molecular weight of the polymer G which was determined by GPC was about 10,000.

(Polymer H)

In a reactor vessel equipped with a reflux condenser, a thermometer, a dropping funnel, a stirrer, and a gas inlet tube, 450 parts of diallyldimethylammonium chloride (60%) and 250 parts of ion exchanged water were placed. The temperature in the system was elevated to 80° C. with nitrogen gas flowing. Under stirring, 30 parts of ammonium persulfate (25%) as a polymerization initiator was added dropwise over 4 hours using the dropping funnel. After completion of dropwise addition, the reaction was continued for additional 1 hour to obtain a viscous pale yellow liquid.

When this viscous liquid was poured into another vessel in which 500 parts of acetone had been placed, a white precipitate was generated. The precipitate was collected by filtration, sufficiently washed twice with 100 parts of acetone, and then dried in vacuo to obtain a white solid as a polymer H.

The yield of the polymer H was 83%.

The cation density of the polymer H which was determined by the colloidal titration method was 6.2 meq/g.

Further, the weight mean molecular weight of the polymer H which was determined by GPC was about 40,000.

(Polymer I)

In a reactor vessel equipped with a reflux condenser, a thermometer, a dropping funnel, a stirrer, and a gas inlet tube, 230 parts of ion exchanged water, 77 parts of 2-ethylhexyl acrylate, 2 parts of glycidyl methacrylate, 20 parts of acrylonitrile, 1 part of methacryloyloxyethyl trimethylammonium chloride, 5 parts of polyoxyethylene lauryl ether, and 1 part of an azo polymerization initiator (available from Wako Pure Chemical Industries, Ltd., V-601) were placed. The mixture was sufficiently stirred, and then warmed to 70° C. to initiate polymerization. The reaction was continued for 3 hours. Then the temperature was elevated to 80° C., and the reaction was continued for 3 hours. Then the reaction was terminated by cooling. In this manner, a polymer I was obtained. The polymerization conversion ratio determined from solid content concentration was 96%. Then, an adequate amount of ion exchanged water was added to prepare a solution having a solid content concentration of 25%. The cation density of the polymer I which was determined by the colloidal titration method was 0.05 meq/g.

Upon blending operation, the polymers A to C, F, G, and H were used as aqueous solutions of 20% concentration prepared with ion exchanged water. The polymers D, E, and I were used as they were.

<Production of Particulate Polymer>

(Particulate Polymer 1)

In a polymerization tank A, 5 parts of styrene, 10 parts of butadiene, 3 parts of polyoxyethylene alkyl ether (available from Kao Corporation, EMULGEN 1150S-60), and 70 parts of ion exchanged water were placed, and sufficiently stirred. Then, the temperature was set to 70° C., and 0.3 parts of a water soluble azo polymerization initiator (available from Wako Pure Chemical Industries, Ltd., VA-086) as a polymerization initiator, and 10 parts of ion exchanged water were added. The mixture was stirred for 120 minutes.

Separately, in another polymerization tank B, 47 parts of styrene, 38 parts of butadiene, 10 parts of polyoxyethylene alkyl ether, and 30 parts of ion exchanged water were placed and stirred to prepare an emulsion.

Then the prepared emulsion was continuously transferred from the polymerization tank B into the polymerization tank A over about 300 minutes, and the mixture was stirred for about 180 minutes. When the consumption amount of the monomer was 95%, the reaction was terminated by cooling. In this manner, an aqueous dispersion liquid of a styrene-butadiene particulate polymer 1 having a solid content concentration of 40%, a number mean particle diameter of 150 nm, and a glass transition temperature of −15° C. was obtained.

(Particulate Polymer 2)

In a polymerization tank A, 12 parts of butyl acrylate, 2 parts of acrylonitrile, 2 parts of polyoxyethylene alkyl ether, and 60 parts of ion exchanged water were placed, and sufficiently stirred. Then, the temperature was set to 70° C., and 0.25 parts of a water soluble azo polymerization initiator as a polymerization initiator, and 10 parts of ion exchanged water were added. The mixture was stirred for 60 minutes.

Separately, in another polymerization tank B, 70 parts of butyl acrylate, 16 parts of acrylonitrile, 3 parts of polyoxyethylene alkyl ether, and 46 parts of ion exchanged water were placed, and stirred to prepare an emulsion.

Then the prepared emulsion was continuously transferred from the polymerization tank B into the polymerization tank A over about 180 minutes, and the mixture was stirred for about 120 minutes. When the consumption amount of the monomer was 95%, the reaction was terminated by cooling. In this manner, an aqueous dispersion liquid of a butyl acrylate-acrylonitrile particulate polymer 2 having a solid content concentration of 40%, a number mean particle diameter of 200 nm, and a glass transition temperature of −35° C. was obtained.

(Particulate Polymer 3)

In a polymerization tank A, 1 part of itaconic acid, 1.0 part of sodium dodecylbenzenesulfonate, and 80 parts of ion exchanged water were placed, and sufficiently stirred.

Separately, in another polymerization tank B, 50 parts of butadiene, 48 parts of styrene, 1 part of itaconic acid, 1.0 part of sodium dodecylbenzenesulfonate, and 45 parts of ion exchanged water were placed, and stirred to prepare an emulsion.

Then the temperature in the polymerization tank A was set to 70° C., and one thirtieth of the emulsion prepared in the polymerization tank B was continuously added to the polymerization tank A. Five minutes after the addition, 0.5 parts of ammonium persulfate as a polymerization initiator, and 10 parts of ion exchanged water were added to the polymerization tank A, and the rest of the emulsion in the polymerization tank B was continuously added to the polymerization tank A over 300 minutes. Then the mixture was stirred for about 240 minutes. When the consumption amount of the monomer was 95%, the reaction was terminated by cooling. In this manner, an aqueous dispersion liquid of a styrene-butadiene particulate polymer 3 containing a structural unit derived from itaconic acid in a proportion of 2% (containing ratio of structural unit derived from a monomer containing an anion (anionic group): 2%), and having a number mean particle diameter of 100 nm, and a glass transition temperature of −17° C. was obtained.

(Particulate Polymer 4)

In a polymerization tank A, 12 parts of 2-ethylhexyl acrylate, 5 parts of styrene, 0.05 parts of sodium lauryl sulfate, and 70 parts of ion exchanged water were placed, and sufficiently stirred. Then, the temperature was set to 70° C., and 0.2 parts of a water soluble azo polymerization initiator as a polymerization initiator, and 10 parts of ion exchanged water were added. The mixture was stirred for 120 minutes.

Separately, in another polymerization tank B, 53 parts of 2-ethylhexyl acrylate, 28 parts of styrene, 2 parts of methacrylic acid, 0.2 parts of sodium lauryl sulfate, and 30 parts of ion exchanged water were placed, and stirred to prepare an emulsion.

Then the prepared emulsion was continuously transferred from the polymerization tank B into the polymerization tank A over about 420 minutes, and the mixture was stirred for about 300 minutes. When the consumption amount of the monomer was 95%, the reaction was terminated by cooling. In this manner, an aqueous dispersion liquid of a 2-ethylhexyl acrylate-styrene particulate polymer 4 having a solid content concentration of 40%, a number mean particle diameter of 150 nm, and a glass transition temperature of −26° C. was obtained.

(Particulate Polymer 5)

In a polymerization tank A, 0.2 parts of itaconic acid, 0.3 parts of sodium dodecylbenzenesulfonate, and 80 parts of ion exchanged water were placed, and sufficiently stirred.

Separately, in another polymerization tank B, 35 parts of butadiene, 64.6 parts of styrene, 0.2 parts of itaconic acid, 0.5 parts of sodium dodecylbenzenesulfonate, and 45 parts of ion exchanged water were placed, and stirred to prepare an emulsion.

Then the temperature in the polymerization tank A was set to 70° C., and one thirtieth of the emulsion prepared in the polymerization tank B was successively added to the polymerization tank A. Five minutes after the addition, 0.5 parts of ammonium persulfate as a polymerization initiator, and 10 parts of ion exchanged water were added to the polymerization tank A, and the rest of the emulsion in the polymerization tank B was continuously added to the polymerization tank A over 300 minutes. Then the mixture was stirred for about 240 minutes. When the consumption amount of the monomer was 95%, the reaction was terminated by cooling. In this manner, an aqueous dispersion liquid of a styrene-butadiene particulate polymer 5 containing a structural unit derived from itaconic acid in a proportion of 0.4% (containing ratio of structural unit derived from a monomer containing an anion (anionic group): 2%), and having a number mean particle diameter of 130 nm, and a glass transition temperature of 10° C. was obtained. An adequate amount of ion exchanged water was added to the aqueous dispersion liquid of the obtained particulate polymer 5 to prepare a solution having a solid content concentration of 40%.

Example 1

Production of Slurry for Electrode

"DAICEL 2200" available from DAI-ICHI KOGYO SEIYAKU CO., LTD., was used as carboxymethyl cellulose (CMC) to prepare a 1.0% CMC aqueous solution.

In a planetary mixer equipped with a disper, 100 parts of artificial graphite having a mean particle diameter of 24.5 μm as an electrode active material, 0.1 parts (based on a solid content) of the polymer A as a polymer having a cationic group, and 0.9 parts of 1% CMC aqueous solution were placed, and the solid content concentration was prepared to 53.5% with ion exchanged water. Then the mixture was stirred at 25° C. for 60 minutes. Then ion exchanged water was added to prepare a solution having a solid content concentration of 44%, and then the mixture were further stirred at 25° C. for 15 minutes.

To the mixture, 1.0 part (based on the solid content) of the aqueous dispersion liquid of particulate polymer 1 having a solid content concentration of 40% as a particulate polymer was added. Further, ion exchanged water was added thereto for preparing a solution having the final solid content concentration of 55%. The mixture was further stirred for 10 minutes. This mixture was defoamed under reduced pressure to obtain a slurry for an electrode (slurry composition for an electrode) having good fluidity. The ratio of the polymer having a cationic group relative to the particulate polymer at this time was 9:91 (by weight) based on the solid content.

Evaluation results of the rate of change of the viscosity of the slurry for an electrode after 5 hours are shown in Table 2.

(Production of Negative Electrode Half-Cell)

The aforementioned slurry for an electrode was applied to one side of copper foil having a thickness of 18 μm with Comma Coater so as to have a film thickness after drying of 200 μm, dried at 50° C. for 20 minutes, and then heated at 110° C. for 20 minutes to obtain an original sheet for an electrode. The original sheet for an electrode was pressed with a roll press to obtain an electrode for a negative electrode having a thickness of electrode active material layer of 80 μm. The thickness of the coated layer of the obtained electrode was measured, and it was found out that the thickness was approximately uniform.

The electrode for an negative electrode was cut out to obtain a disk shape having a diameter of 15 mm. On the electrode active material layer side of the negative electrode, a separator formed of a polypropylene porous film having a disk shape with a diameter of 18 mm and a thickness of 25 μm, metal lithium used as a positive electrode, and expanded metal were stacked in this order. This stack was put in a coin-type outer container made of stainless steel (diameter: 20 mm, height: 1.8 mm, and stainless steel thickness: 0.25 mm) in which a polypropylene packing was installed. An electrolytic solution was poured in the container so that air is purged. Then the outer container was covered with a stainless steel cap having a thickness of 0.2 mm via the polypropylene packing and the cap was fixed to seal a battery can, to thereby produce a negative electrode half-cell having a diameter of 20 mm and a thickness of about 2 mm.

As the electrolytic solution, a solution obtained by dissolving $LiPF_6$ at a concentration of 1 mol/l in a mixed solvent of ethylene carbonate (EC) and diethyl carbonate (DEC) in a ratio of ED:DEC=1:2 (volume ratio at 20° C.) was used.

Evaluation results of the performance of the battery are shown in Table 2.

Example 2

A slurry for an electrode and a negative electrode half-cell were produced in the same manner as in Example 1 except for using the particulate polymer 2 in place of the particulate polymer 1. The performance of the battery was evaluated. The results are shown in Table 2.

Example 3

A slurry for an electrode and a negative electrode half-cell were produced in the same manner as in Example 2 except for using the polymer B in place of the polymer A. The performance of the battery was evaluated. The results are shown in Table 2.

Example 4

A slurry for an electrode and a negative electrode half-cell were produced in the same manner as in Example 2 except for using the polymer C in place of the polymer A. The performance of the battery was evaluated. The results are shown in Table 2.

Example 5

A slurry for an electrode and a negative electrode half-cell were produced in the same manner as in Example 1 except for using the polymer D in place of the polymer A. The performance of the battery was evaluated. The results are shown in Table 2.

Example 6

A slurry for an electrode and a negative electrode half-cell were produced in the same manner as in Example 1 except for using the polymer E in place of the polymer A. The performance of the battery was evaluated. The results are shown in Table 2.

Example 7

A slurry for an electrode and a negative electrode half-cell were produced in the same manner as in Example 1 except that the polymer F was used in place of the polymer A, that the particulate polymer 3 was used in place of the particulate polymer 1, and that the ratio by weight of the polymer having a cationic group relative to the particulate polymer was changed to 20:80. The performance of the battery was evaluated. The results are shown in Table 2.

Example 8

A slurry for an electrode and a negative electrode half-cell were produced in the same manner as in Example 7 except for using the polymer B in place of the polymer F. The performance of the battery was evaluated. The results are shown in Table 2.

Example 9

A slurry for an electrode and a negative electrode half-cell were produced in the same manner as in Example 7 except that the ratio by weight of the polymer having a cationic group relative to the particulate polymer was changed to 6:94. The performance of the battery was evaluated. The results are shown in Table 2.

Example 10

A slurry for an electrode and a negative electrode half-cell were produced in the same manner as in Example 7 except that the ratio by weight of the polymer having a cationic group relative to the particulate polymer was changed to 40:60. The performance of the battery was evaluated. The results are shown in Table 2.

Example 11

A slurry for an electrode and a negative electrode half-cell were produced in the same manner as in Example 7 except for using the particulate polymer 4 in place of the particulate polymer 3. The performance of the battery was evaluated. The results are shown in Table 2.

Example 12

A slurry for an electrode and a negative electrode half-cell were produced in the same manner as in Example 7 except for using the particulate polymer 5 in place of the particulate polymer 3 The performance of the battery was evaluated. The results are shown in Table 2.

Example 13

100 parts of spinel manganese ($LiMn_2O_4$) as an electrode active material, 0.1 parts (based on a solid content) of the polymer A as a polymer having a cationic group, 5 parts of acetylene black (HS-100: DENKI KAGAKU KOGYO KABUSHIKI KAISHA), 1.0 part of the aqueous dispersion liquid of particulate polymer 2 having a solid content concentration of 40% as a particulate polymer, 40 parts (solid content concentration: 2%) of a carboxymethyl cellulose aqueous solution having a degree of etherification of 0.8 as a thickener, and an adequate amount of water were stirred in a planetary mixer to prepare a slurry for a positive electrode. Evaluation results of the rate of change of the viscosity of the slurry for a positive electrode after 5 hours are shown in Table 3.

(Production of Battery)

The aforementioned slurry for a positive electrode was applied to one side of aluminum foil having a thickness of 20 μm with Comma Coater, dried at 60° C. for 20 minutes, and then heated at 120° C. for 20 minutes to obtain an original sheet for an electrode. The original sheet for an electrode was pressed with a roll press to obtain an electrode for a positive electrode having a thickness of electrode active material layer of 70 μm. The thickness of the coated layer of the obtained electrode was measured, and it was found out that the thickness was approximately uniform.

The electrode for a positive electrode was cut out to obtain a disk shape having a diameter of 15 mm. On the electrode active material layer side of the positive electrode, a separator formed of a polypropylene porous film having a disk shape with a diameter of 18 mm and a thickness of 25 μm, metal lithium used as a negative electrode, and expanded metal were stacked in this order. This stack was put in a coin-type outer container made of stainless steel (diameter: 20 mm, height: 1.8 mm, and stainless steel thickness: 0.25 mm) in which a polypropylene packing was installed. An electrolytic solution was poured in the container so that air is purged. Then the outer container was covered with a stainless steel cap having a thickness of 0.2 mm via the polypropylene packing and the cap was fixed to seal a battery can, to thereby produce a positive electrode half-cell having a diameter of 20 mm and a thickness of about 2 mm.

As the electrolytic solution, a solution obtained by dissolving $LiPF_6$ at a concentration of 1 mol/l in a mixed solvent of ethylene carbonate (EC) and diethyl carbonate (DEC) in a ratio of ED:DEC=1:2 (volume ratio at 20° C.) was used.

Evaluation results of the performance of the battery are shown in Table 3.

Example 14

To the aqueous dispersion liquid of particulate polymer 2 having a solid content concentration of 40%, N-methylpyrrolidone (NMP) in an amount three times that of the total amount of the dispersion liquid was added. The moisture was evaporated with an evaporator. The solution was prepared to a solid content concentration of 10% with NMP, to thereby obtain a dissolved product of the particulate polymer 2 in NMP. Similarly, to the polymer A having a cationic group, NMP in an amount three times that of the total amount of the solution was added, the moisture was evaporated with the evaporator, and the solution was prepared to a solid content concentration of 10% with NMP, to thereby obtain a dissolved product of the polymer A in NMP.

In a planetary mixer equipped with a disper, 100 parts of artificial graphite having a mean particle diameter of 24.5 μm as an electrode active material, 0.1 parts (based on a solid content) of the polymer A as a polymer having a cationic group, and 1.0 part of the dissolved product of the particulate polymer 2 in NMP were placed, and the solution was prepared to the solid content concentration of 50% with NMP. The solution was stirred at 25° C. for 60 minutes to obtain a slurry for an electrode (slurry composition for an electrode) having good fluidity. The ratio of the polymer having a cationic group relative to the particulate polymer at this time was 9:91 (by weight).

Evaluation results of the rate of change of the viscosity of the slurry for an electrode after 5 hours are shown in Table 2.

Then, a negative electrode half-cell was produced in the same manner as in Example 1, and the performance of the battery was evaluated. Evaluation results are shown in Table 2.

Example 15

A slurry for an electrode and a negative electrode half-cell were produced in the same manner as in Example 1 except for using the polymer G in place of the polymer A. The performance of the battery was evaluated. The results are shown in Table 2.

Example 16

A slurry for an electrode and a negative electrode half-cell were produced in the same manner as in Example 1 except for using the polymer C in place of the polymer A. The performance of the battery was evaluated. The results are shown in Table 2.

Example 17

A slurry for an electrode and a negative electrode half-cell were produced in the same manner as in Example 1 except for using a polyvinylidene fluoride-hexafluoropropylene copolymer particle (hereinafter this may be referred to as "PVDF-HFP polymer particle") having a solid content concentration of 40% and a glass transition temperature of −5° C. in place of the particulate polymer 1. The performance of the battery was evaluated. The results are shown in Table 2.

Example 18

A slurry for an electrode and a negative electrode half-cell were produced in the same manner as in Example 1 except for using the polymer F in place of the polymer A. The performance of the battery was evaluated. The results are shown in Table 2.

Example 19

A slurry for an electrode and a negative electrode half-cell were produced in the same manner as in Example 1 except for using the polymer H in place of the polymer A. The performance of the battery was evaluated. The results are shown in Table 2.

Example 20

A slurry for an electrode and a negative electrode half-cell were produced in the same manner as in Example 1 except for using the polymer B in place of the polymer A. The performance of the battery was evaluated. The results are shown in Table 2.

Comparative Example 1

A slurry for an electrode and a negative electrode half-cell were produced in the same manner as in Example 1 except that the polymer I was used in place of the polymer A and that the particulate polymer was not used. The performance of the battery was evaluated. The results are shown in Table 2.

Comparative Example 2

A slurry for an electrode and a negative electrode half-cell were produced in the same manner as in Example 7 except for, in place of the polymer B, using 2-aminoethanesulfonic acid which is not a cation-containing polymer (that is, polymer having a cationic group) but a cation-containing low molecular composition. The performance of the battery was evaluated. The results are shown in Table 2.

Comparative Example 3

A slurry for an electrode and a negative electrode half-cell were produced in the same manner as in Example 7 except for not using the polymer having a cationic group. The performance of the battery was evaluated. The results are shown in Table 2.

Comparative Example 4

A slurry for an electrode and a negative electrode half-cell were produced in the same manner as in Example 7 except for using a polyethyleneimine polymer (trade name EPOMIN SP-200) in place of the polymer A. The performance of the battery was evaluated. The results are shown in Table 2.

Comparative Example 5

A slurry for a positive electrode and a positive electrode half-cell were produced in the same manner as in Example 13 except for not using the polymer having a cationic group. The performance of the battery was evaluated. The results are shown in Table 3.

TABLE 1

| | | Constitution of Polymers | | | |
|---|---|---|---|---|---|
| Polymer | Name | Cation species | Cation density (meq/g) | Counter anion | Molecular weight |
| Polymer A | Diallyl dimethyl ammonium chloride-acrylamide copolymer | Quaternary | Alicyclic cationic group | 5.9 | $Cl^-$ | 200,000 |
| Polymer B | Methyl diallyl amine hydrochloride polymer | Tertiary | Alicyclic cationic group | 6.8 | $Cl^-$ | 20,000 |
| Polymer C | Diallyl dimethyl ammonium ethyl sulfate polymer | Quaternary | Alicyclic cationic group | 4.2 | $C_2H_5SO_4^{2-}$ | 37,000 |
| Polymer D | Dimethyl aminopropyl acrylamide methyl chloride-quaternary salt polymer | Quaternary | Aliphatic cationic group | 4.8 | $Cl^-$ | 50,000 |
| Polymer E | Dimethyl aminoethyl acrylate methyl chloride-quaternary salt polymer | Quaternary | Aliphatic cationic group | 5.2 | $Cl^-$ | 80,000 |
| Polymer F | Diallyl methylethyl ammonium ethyl sulfate-maleic acid copolymer | Quaternary | Alicyclic cationic group | 2.6 | $C_2H_5SO_4^{2-}$ | 10,000 |
| Polymer G | Diallyl dimethyl ammonium chloride acrylamide copolymer | Quaternary | Alicyclic cationic group | 5.9 | $Cl^-$ | 10,000 |
| Polymer H | Diallyl dimethyl ammonium chloride polymer | Quaternary | Alicyclic cationic group | 6.2 | $Cl^-$ | 40,000 |

TABLE 1-continued

| | | Constitution of Polymers | | | |
|---|---|---|---|---|---|
| Polymer | Name | Cation species | Cation density (meq/g) | Counter anion | Molecular weight |
| Polymer I | 2-ethylhexyl acrylate-acrylonitrile-glycidyl methacrylate-methacryloyl oxyethyl trimethyl ammonium chloride copolymer | Quaternary Aliphatic cationic group | 0.05 | Cl$^-$ | Not measurable |

TABLE 2

Results of Examples 1-12 and 14-20, and Comparative Examples 1-4

| | | Particulate polymer | | | Mix ratio Cation containing substance/ particulate polymer | | Evaluation results | | | |
|---|---|---|---|---|---|---|---|---|---|---|
| | Cation containing substance | Species | Presence of anion | Glass transition temperature | | Slurry stability | 0° C. low temperature characteristics | −30° C. low temperature characteristics | Li deposition amount | Peel strength |
| Ex. 1 | Polymer A | Particulate polymer 1 | No | −15° C. | 9/91 | A | A | C | C | C |
| Ex. 2 | Polymer A | Particulate polymer 2 | No | −35° C. | 9/91 | A | A | A | A | B |
| Ex. 3 | Polymer B | Particulate polymer 2 | No | −35° C. | 9/91 | C | A | B | B | B |
| Ex. 4 | Polymer C | Particulate polymer 2 | No | −35° C. | 9/91 | A | A | B | B | B |
| Ex. 5 | Polymer D | Particulate polymer 1 | No | −15° C. | 9/91 | A | A | B | A | C |
| Ex. 6 | Polymer E | Particulate polymer 1 | No | −15° C. | 9/91 | A | A | B | A | C |
| Ex. 7 | Polymer F | Particulate polymer 3 | Yes | −17° C. | 20/80 | A | A | A | A | A |
| Ex. 8 | Polymer B | Particulate polymer 3 | Yes | −17° C. | 20/80 | C | B | A | B | B |
| Ex. 9 | Polymer F | Particulate polymer 3 | Yes | −17° C. | 6/94 | A | C | C | C | A |
| Ex. 10 | Polymer F | Particulate polymer 3 | Yes | −17° C. | 40/60 | C | B | C | C | C |
| Ex. 11 | Polymer F | Particulate polymer 4 | No | −26° C. | 20/80 | A | B | C | B | D |
| Ex. 12 | Polymer F | Particulate polymer 5 | Yes | 10° C. | 20/80 | A | C | C | C | C |
| Ex. 14 | Polymer A | Particulate polymer 2 solution in NMP | No | −35° C. | 9/91 | B | C | C | C | B |
| Ex. 15 | Polymer G | Particulate polymer 1 | No | −15° C. | 9/91 | A | A | C | C | C |
| Ex. 16 | Polymer C | Particulate polymer 1 | No | −15° C. | 9/91 | A | A | C | A | C |
| Ex. 17 | Polymer A | PVDF-HFP | No | −5° C. | 9/91 | A | C | C | C | C |
| Ex. 18 | Polymer F | Particulate polymer 1 | No | −15° C. | 9/91 | A | C | C | C | C |
| Ex. 19 | Polymer H | Particulate polymer 1 | No | −15° C. | 9/91 | B | A | C | A | C |
| Ex. 20 | Polymer B | Particulate polymer 1 | No | −15° C. | 9/91 | C | A | B | B | C |
| Comp. Ex. 1 | Polymer I | None | No | None | 100/0 | B | E | E | D | B |

TABLE 2-continued

Results of Examples 1-12 and 14-20, and Comparative Examples 1-4

| | Cation containing substance | Particulate polymer Species | Presence of anion | Glass transition temperature | Mix ratio Cation containing substance/ particulate polymer | Slurry stability | Evaluation results 0° C. low temperature characteristics | −30° C. low temperature characteristics | Li deposition amount | Peel strength |
|---|---|---|---|---|---|---|---|---|---|---|
| Comp. Ex. 2 | 2-amino ethane sulfonic acid | Particulate polymer 3 | Yes | −17° C. | 20/80 | F | F | F | E | E |
| Comp. Ex. 3 | None | Particulate polymer 3 | Yes | −17° C. | 0/100 | A | F | F | E | A |
| Comp. Ex. 4 | Polyethyleneimine polymer | Particulate polymer 3 | Yes | −17° C. | 20/80 | Significant viscosity increase right after blending; not measurable | | | | |

TABLE 3

Results of Example 13 and Comparative Example 5

| | Cation containing substance | Particulate polymer Species | Presence of anion | Glass transition temperature | Mix ratio Cation containing substance/ particulate polymer | Slurry stability | Evaluation results 0° C. Low temperature characteristics |
|---|---|---|---|---|---|---|---|
| Ex. 13 | Polymer A | Particulate polymer 2 | No | −35° C. | 9/91 | B | A |
| Comp. Ex. 5 | None | Particulate polymer 2 | No | −35° C. | 0/100 | B | D |

Findings from the results of Tables 2 and 3 are as follows.

According to the present invention, with use of the polymer having a cationic group with the predetermined cation density and a counter anion, a lithium ion secondary battery excellent in all of slurry stability, low-temperature characteristics, and suppression of lithium deposition can be obtained as shown in Examples 1 to 20. Further, in Examples 2 and 13 among Examples, the particulate polymer of acrylate having no anion was co-used, and the quaternary cation having a cation density of 5 to 7 meq/g and a molecular weight of 5,000 to 300,000 was used, whereby Examples 2 and 13 are particularly excellent in slurry stability, low-temperature characteristics, and suppression of lithium deposition. In addition, Example 7 in which the particulate polymer having a predetermined amount of anion was co-used, the cation density was within a range of 2 to 5 meq/g, and the molecular weight was within a range of 5,000 to 300,000 has high peel strength in addition to the aforementioned characteristics, i.e., excellent in all characteristics.

On the other hand, in particular, the cases wherein the cation density was out of the predetermined range (Comparative Examples 1 and 4), the case wherein the polymer having a cationic group and the counter anion were not included and a low molecular composition containing a cation was included (Comparative Example 2), and the cases wherein the polymer having a cationic group and the counter anion were not included (Comparative Examples 3 and 5) are significantly poor in, particularly, low-temperature characteristics and suppression of lithium deposition.

The invention claimed is:

1. An electrode for a secondary battery, comprising an electrode active material layer containing a polymer having a cationic group, a first anion corresponding to the cationic group, a particulate polymer and an electrode active material, wherein a cation density in the polymer having a cationic group is 0.1 to 15 meq/g.

2. The electrode for a secondary battery according to claim 1, wherein a weight ratio of the polymer having a cationic group relative to the particulate polymer in the electrode active material layer is 5:95 to 40:50.

3. The electrode for a secondary battery according to claim 1, wherein the particulate polymer contains a second anion.

4. The electrode for a secondary battery according to claim 1, wherein the cationic group is an alicyclic cationic group or a heterocyclic cationic group.

5. A slurry for a secondary battery electrode, comprising a polymer having a cationic group, a first anion corresponding to the cationic group, particulate polymer, an electrode active material, and a solvent, wherein a cation density in the polymer having a cationic group is 0.1 to 15 meq/g.

6. A secondary battery comprising a positive electrode, a negative electrode, a separator, and an electrolytic solution, wherein at least one of the positive electrode or the negative electrode is the electrode for a secondary battery according to claim 1.

* * * * *